(12) United States Patent
Rossomando et al.

(10) Patent No.: US 10,843,867 B2
(45) Date of Patent: Nov. 24, 2020

(54) BIODEGRADABLE CONTAINER OR CAPSULE

(71) Applicant: Matteo Rossomando, Rome (IT)

(72) Inventors: Matteo Rossomando, Rome (IT); Maria Grazia Tiberti, Rome (IT); Giulio Tommasini, Rome (IT)

(73) Assignee: Matteo Rossomando, Rome (IT)

( * ) Notice: Subject to any disclaimer, the term of this patent is extended or adjusted under 35 U.S.C. 154(b) by 325 days.

(21) Appl. No.: 15/747,442

(22) PCT Filed: Jul. 28, 2016

(86) PCT No.: PCT/IT2016/000187
§ 371 (c)(1),
(2) Date: Jan. 25, 2018

(87) PCT Pub. No.: WO2017/017704
PCT Pub. Date: Feb. 2, 2017

(65) Prior Publication Data
US 2018/0215533 A1 Aug. 2, 2018

(30) Foreign Application Priority Data

Jul. 28, 2015 (IT) .......................... 102015000038644

(51) Int. Cl.
*B65D 85/804* (2006.01)
*B65D 85/46* (2006.01)
*B65D 65/46* (2006.01)

(52) U.S. Cl.
CPC ....... *B65D 85/8043* (2013.01); *B65D 65/466* (2013.01); *C08L 2201/06* (2013.01); *Y02W 90/13* (2015.05)

(58) Field of Classification Search
CPC .. C08B 37/0048; C08H 99/00; B01D 61/145; B01D 21/283; B01D 21/262;
(Continued)

(56) References Cited

U.S. PATENT DOCUMENTS

2004/0115310 A1 6/2004 Yoakim et al.
2010/0288131 A1 11/2010 Kilber et al.
(Continued)

FOREIGN PATENT DOCUMENTS

CN 102282083 12/2011
CN 102596733 7/2012
(Continued)

OTHER PUBLICATIONS

Notification of Office Action and Search Report dated Feb. 11, 2019 From the State Intellectual Property Office of the People's Republic of China Re. Application No. 201580056568.2 and Its Translation of Office Action Into English. (19 Pages).
(Continued)

*Primary Examiner* — John C Hong

(57) ABSTRACT

The invention relates to a biodegradable container (1) for single dose or multi-dose administration of beverages by injecting a fluid solution, under pressure through a preparation, said biodegradable container (1) comprising:
a tubular body (2) having a side wall (22), a first opening (40), and a second opening (23), opposite to said first opening (40);
a first surface (21) coupled to said tubular body (2) in correspondence of said first opening (40), said tubular body (2) and said first surface (21) forming a chamber for containing said preparation; and
a second surface (3) coupled to said tubular body (2) in such a way as to obstruct said second opening (23) and prevent the escape of said preparation,
said biodegradable container (1) being characterized by comprising reinforcement means (4, 42, 49) associated with said side wall (22), and configured to oppose resistance to pressure acting on said biodegradable container (1) during the injection of said fluid solution under pressure.

19 Claims, 14 Drawing Sheets

(58) Field of Classification Search
CPC .................. B01D 11/0288; B01D 11/028;
B01D 61/025; B65D 85/8043; B65D
65/466; Y02W 90/13; C08L 2201/06
See application file for complete search history.

(56) References Cited

U.S. PATENT DOCUMENTS

| | | | |
|---|---|---|---|
| 2010/0307930 | A1 | 12/2010 | Zangerle |
| 2011/0041702 | A1 | 2/2011 | Yoakim et al. |
| 2011/0064852 | A1 | 3/2011 | Mann |
| 2011/0142996 | A1 | 6/2011 | Krüger |
| 2011/0186450 | A1 | 8/2011 | Bonacci |
| 2012/0097602 | A1 | 4/2012 | Tedford |
| 2012/0121765 | A1 | 5/2012 | Kamerbeek et al. |
| 2013/0045308 | A1 | 2/2013 | Gorbatenko |
| 2013/0156897 | A1 | 6/2013 | Goldstein |
| 2017/0081096 | A1* | 3/2017 | Rossomando ....... B65D 65/466 |
| 2018/0242776 | A1* | 8/2018 | Schaling ................ A47J 31/40 |

FOREIGN PATENT DOCUMENTS

| | | |
|---|---|---|
| CN | 102356030 | 4/2014 |
| CN | 103917462 | 7/2014 |
| CN | 104284848 | 10/2016 |
| EP | 2573008 | 3/2013 |
| GB | 2498449 | 7/2013 |
| WO | WO 2011/027259 | 3/2011 |
| WO | WO 2013/046189 | 4/2013 |
| WO | WO 2014/006527 | 1/2014 |
| WO | WO 2014/012778 | 1/2014 |
| WO | WO 2015/011689 | 1/2015 |
| WO | WO 2015/170358 | 11/2015 |
| WO | WO 2017/017704 | 2/2017 |

OTHER PUBLICATIONS

Notification of Office Action and Search Report dated May 30, 2018 From the State Intellectual Property Office of the People's Republic of China Re. Application No. 201580023942.4. (6 Pages).

International Search Report and the Written Opinion dated Dec. 27, 2016 From the International Searching Authority Re. Application No. PCT/IT2016/000187. (12 Pages).

Rapporto di Ricerca e Opinione Scritta [Search Report and the Written Opinion] dated Mar. 8, 2016 From the Ministero della Sviluppo Economico, Direzione Generale Sviluppo Produttivo e Competitivita, Ufficio Italiano Brevetti e Marchi Re. Application No. IT UB20152539. (12 Pages).

Advisory Action Before the Filing of an Appeal Brief dated Jan. 15, 2019 From the U.S. Patent and Trademark Office Re. U.S. Appl. No. 15/308,998. (9 Pages).

Communication Pursuant to Rule 164(2)(b) and Article 94(3) EPC Dated Apr. 30, 2018 From the European Patent Office Re. Application No. 15738485.0. (5 Pages).

\* cited by examiner

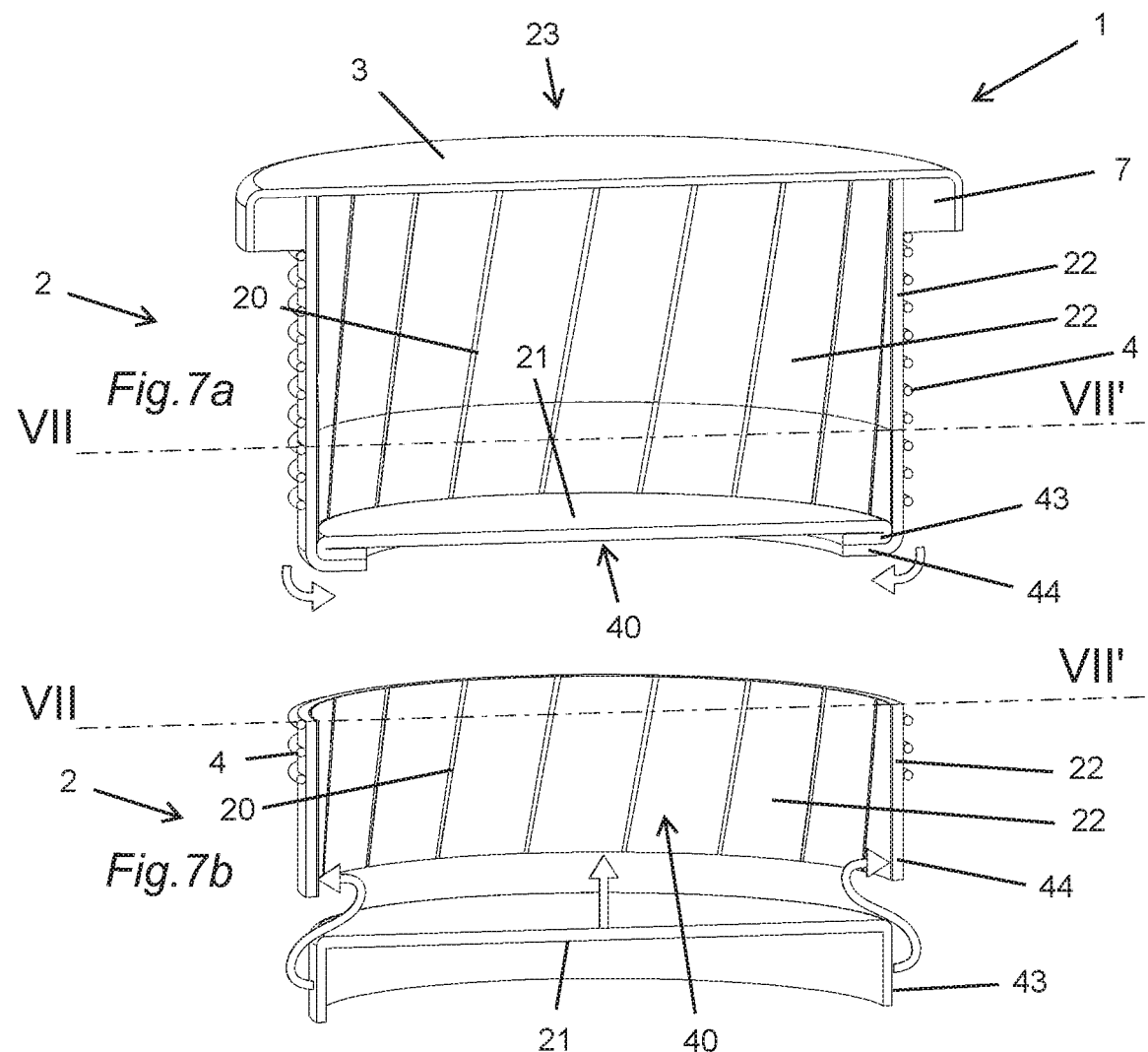

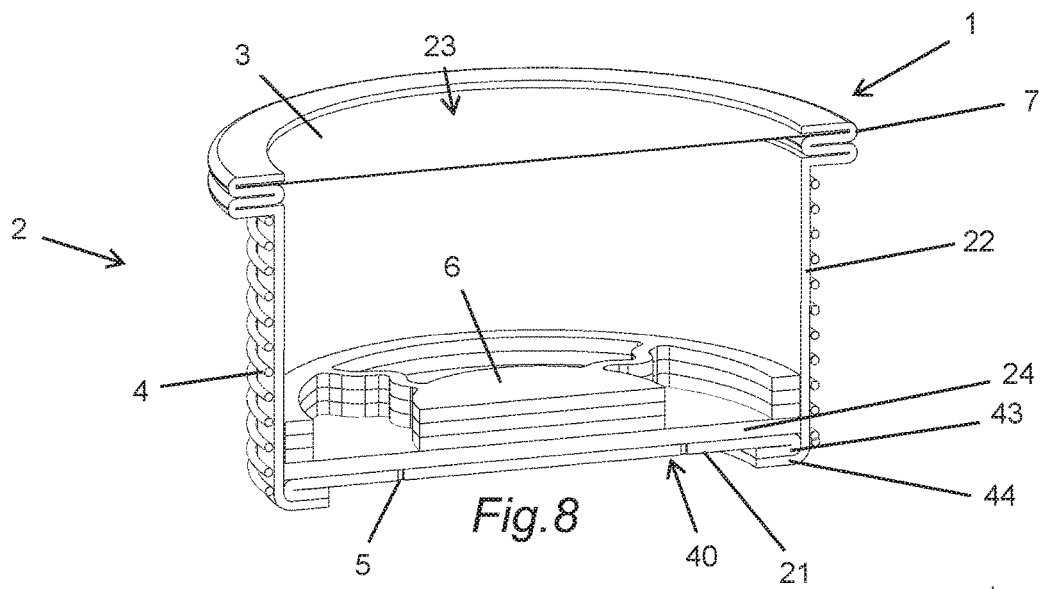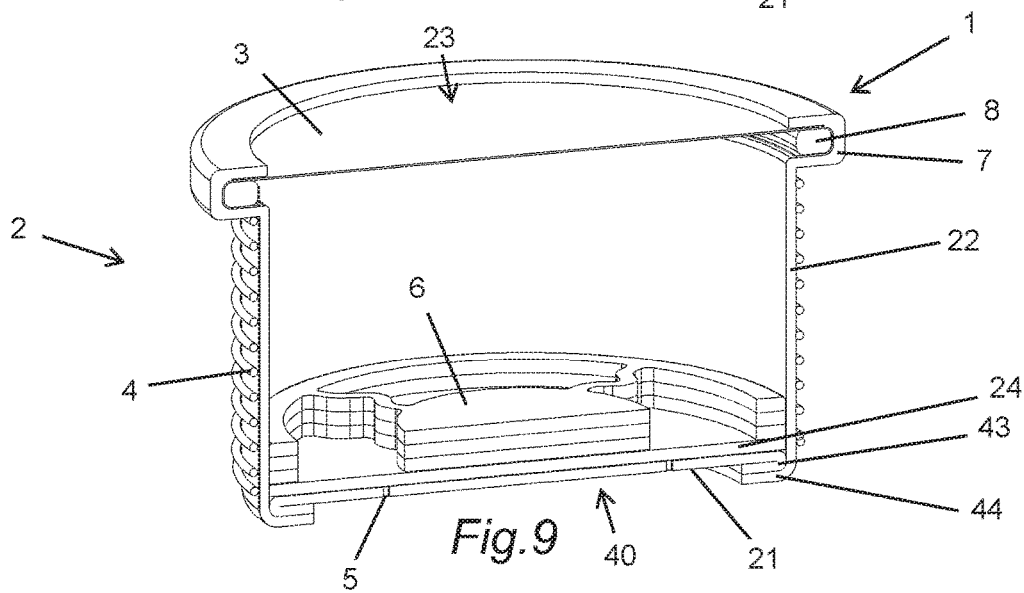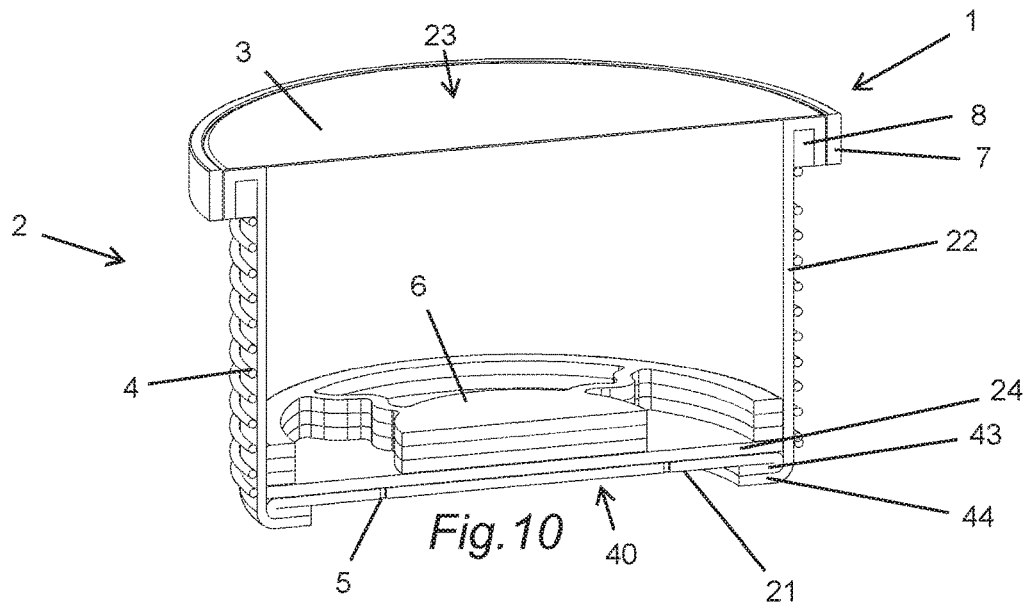

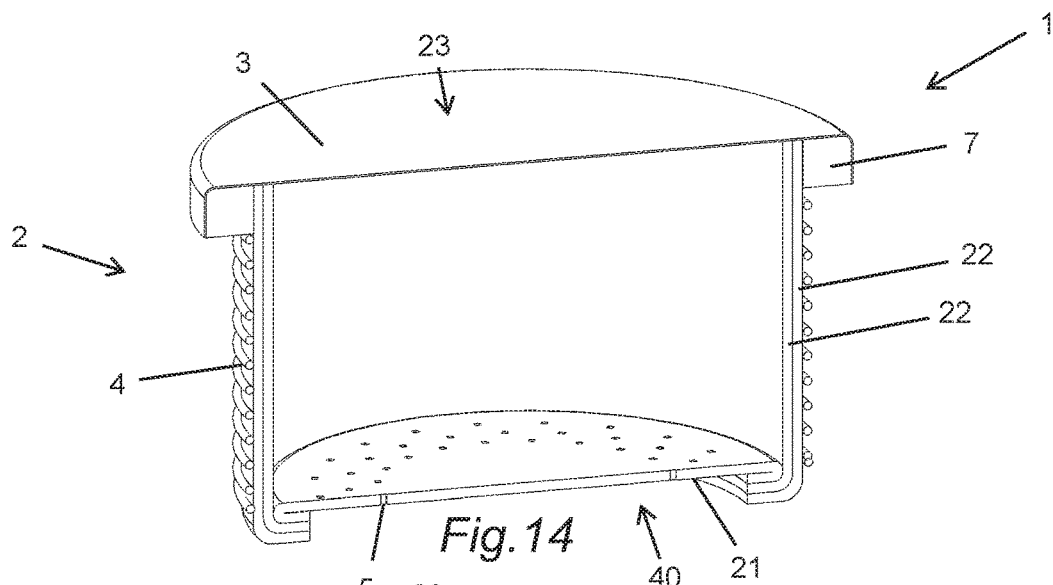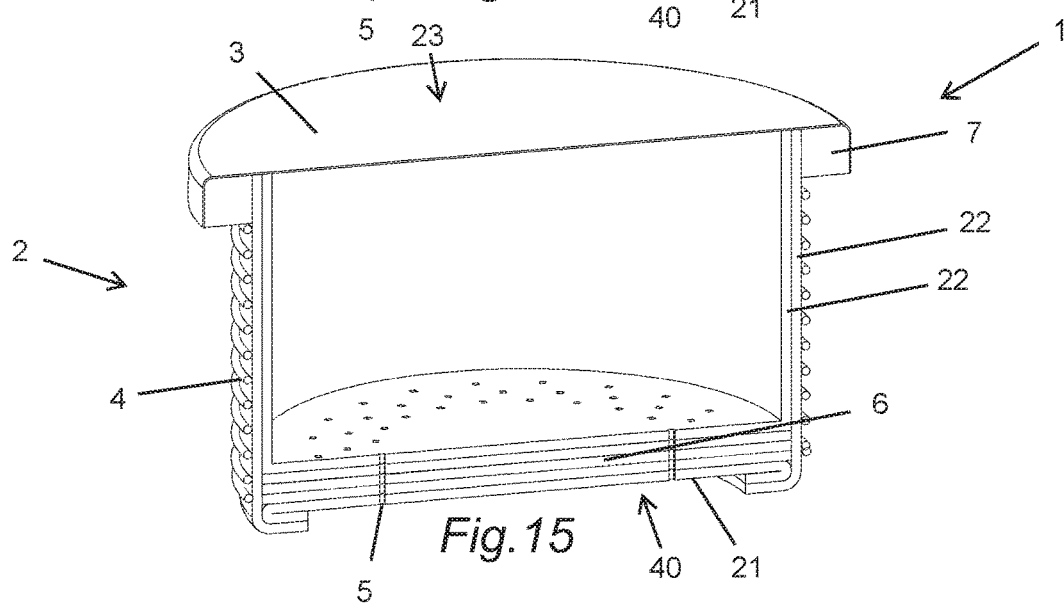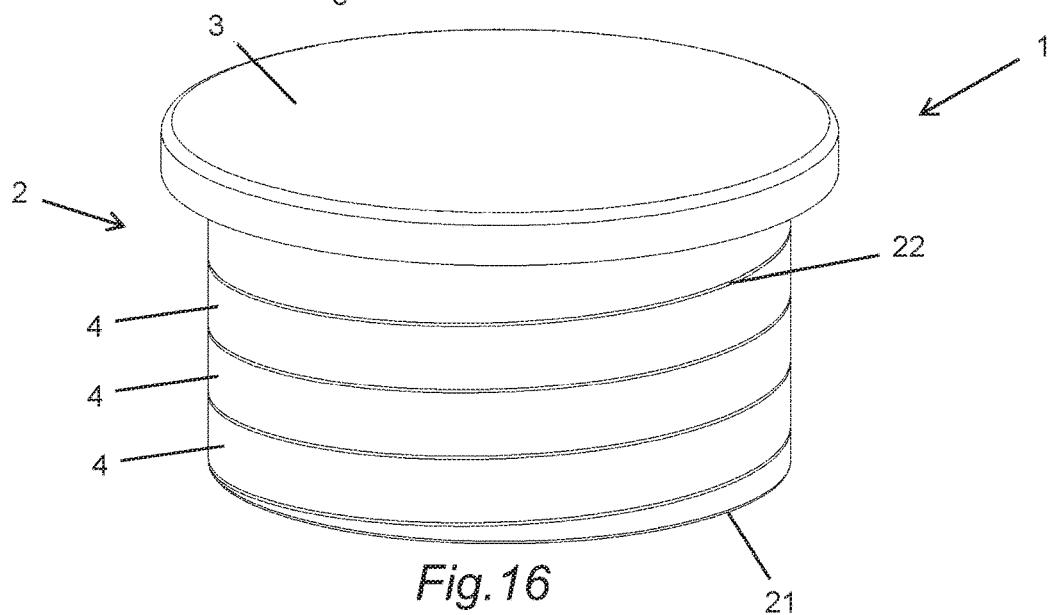

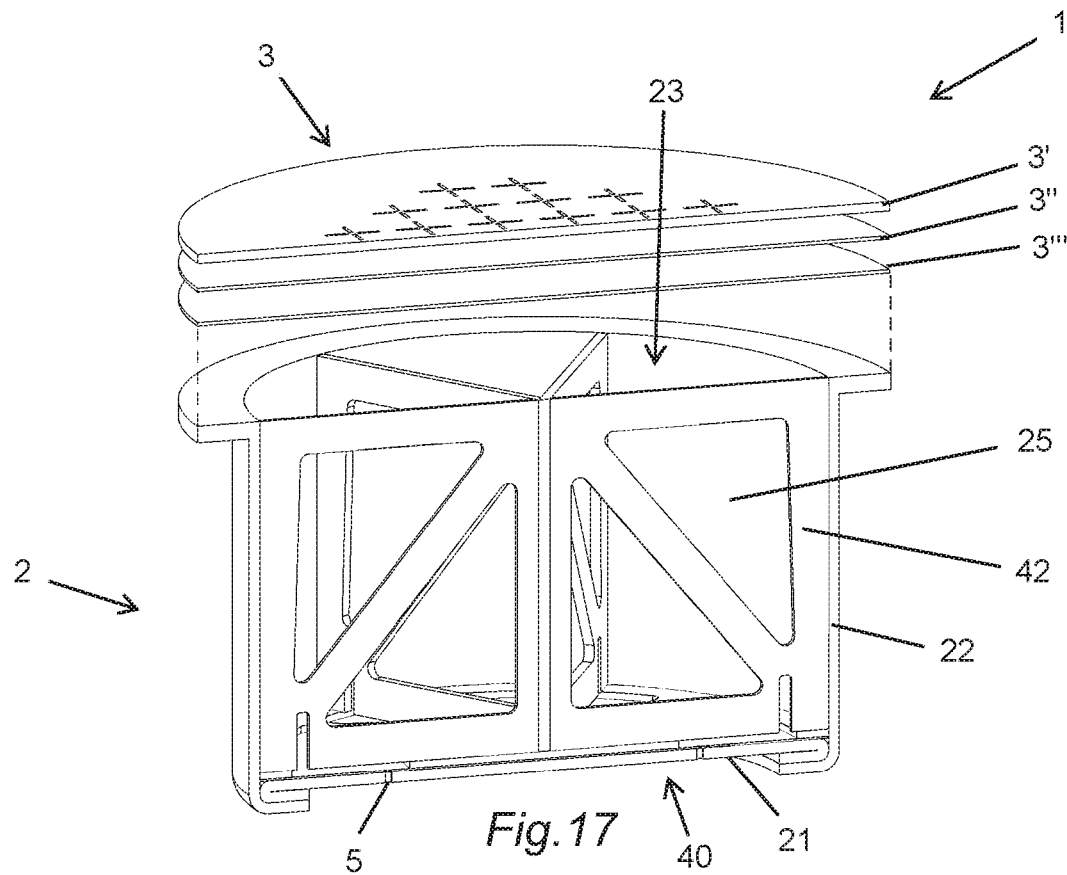
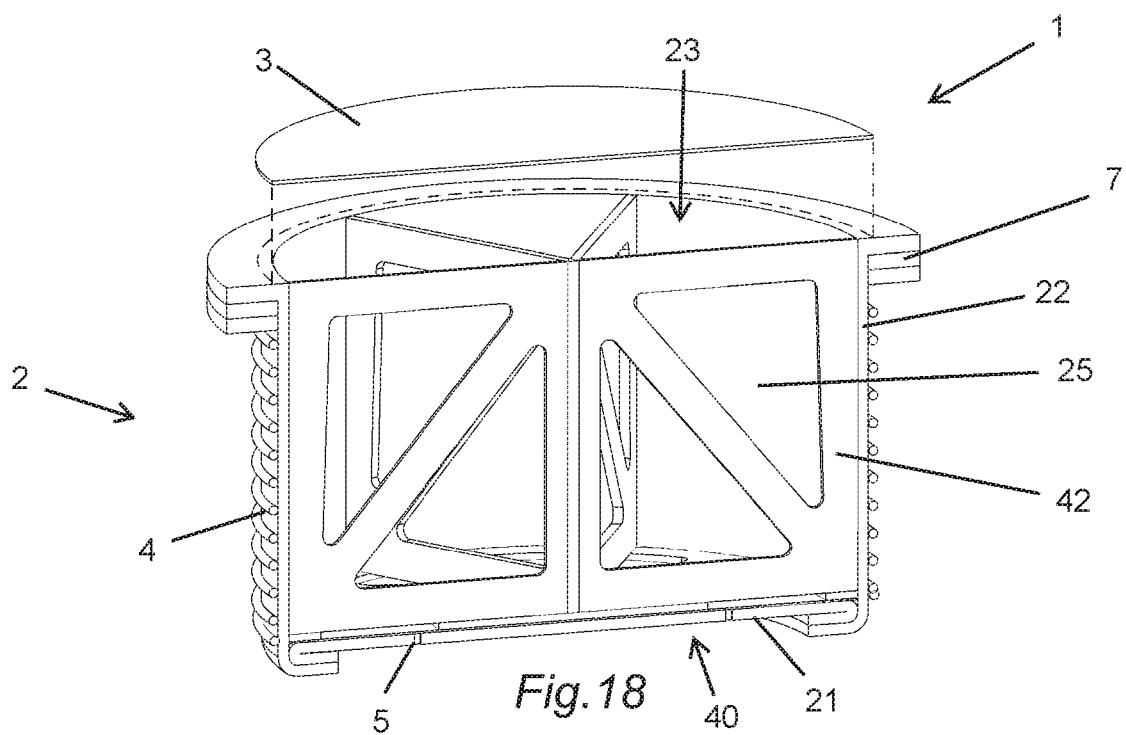

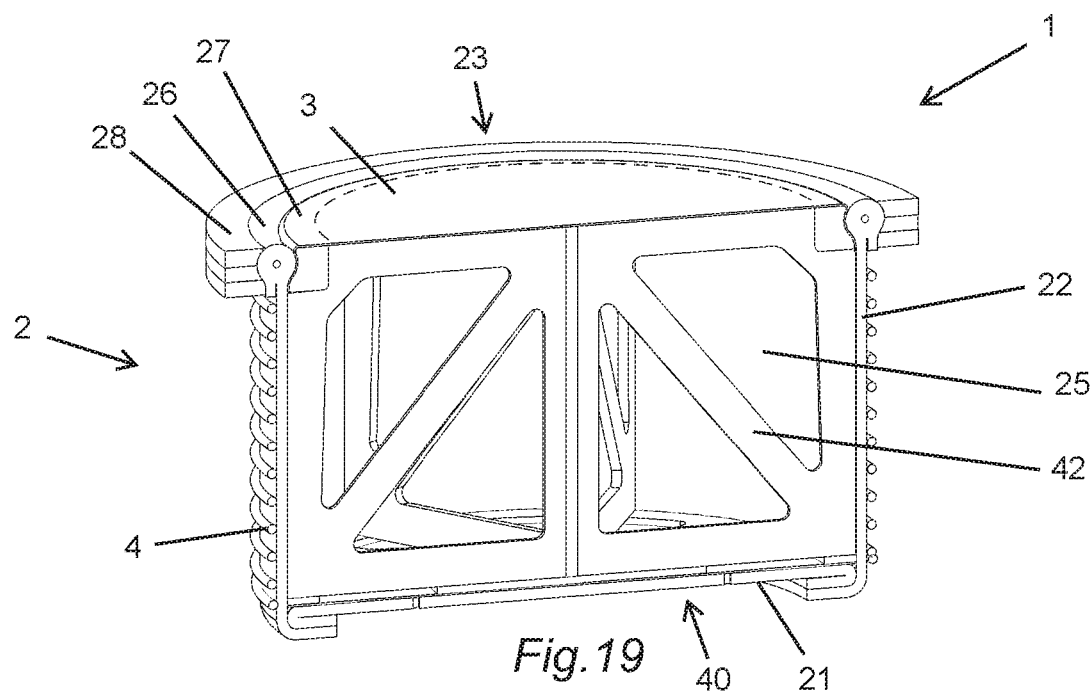
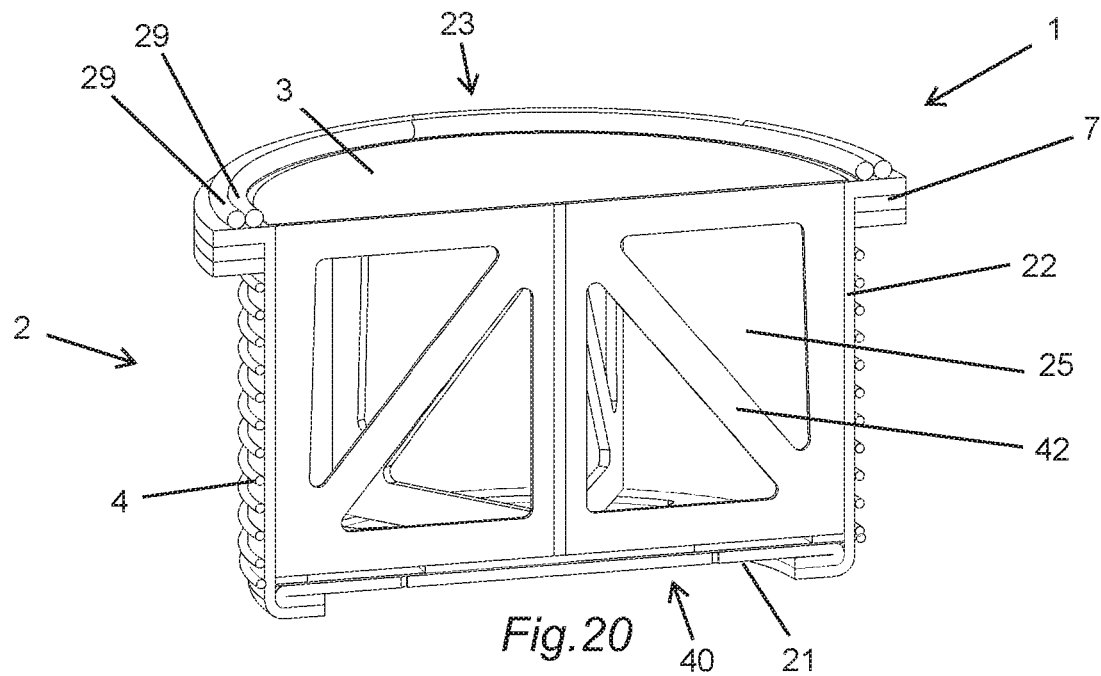

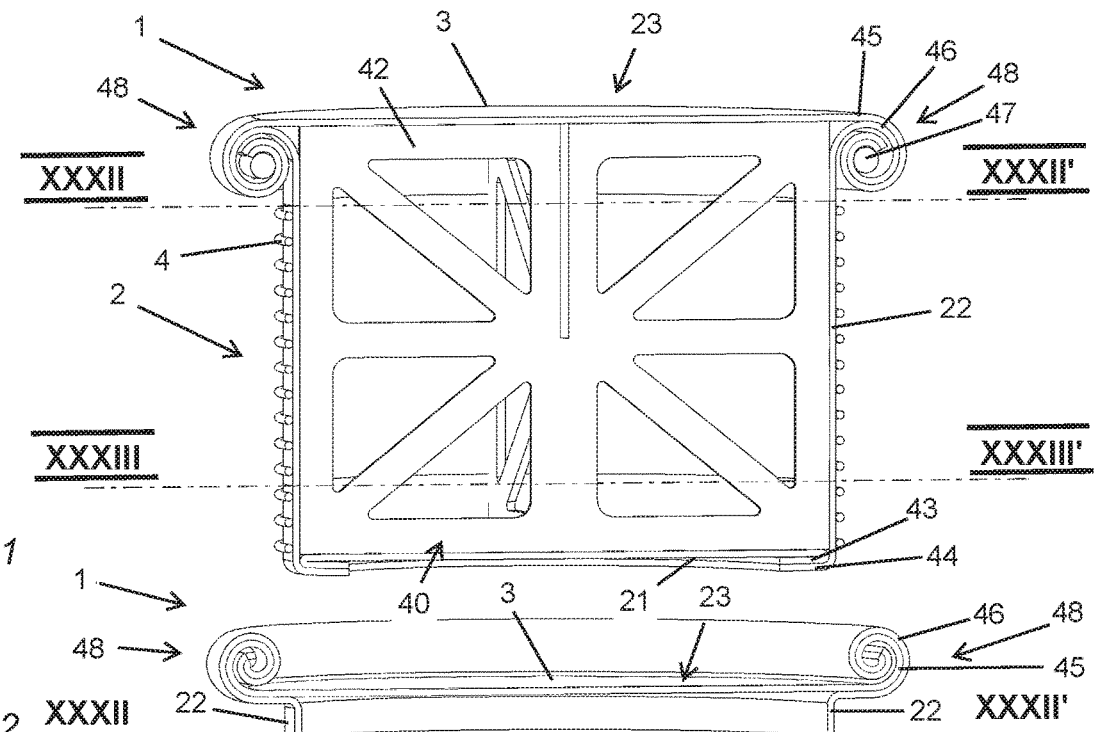
Fig.31
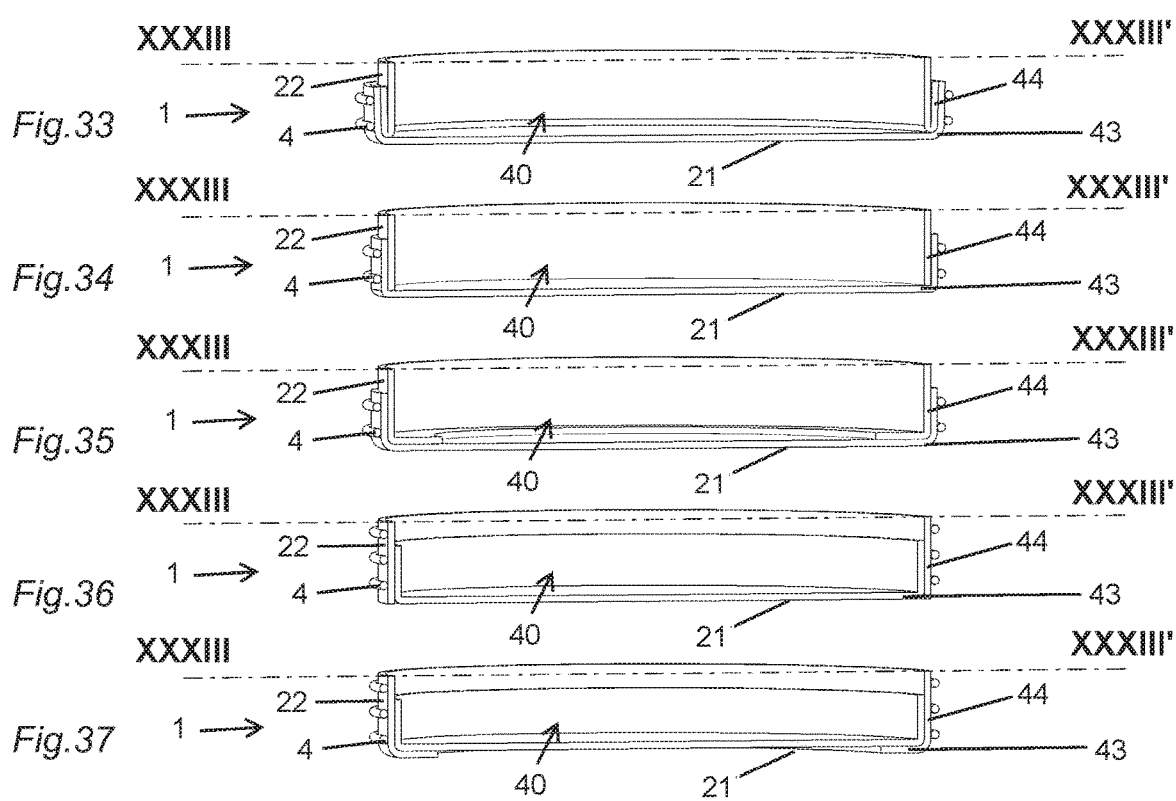
Fig.32
Fig.33
Fig.34
Fig.35
Fig.36
Fig.37

BIODEGRADABLE CONTAINER OR CAPSULE

RELATED APPLICATIONS

This application is a National Phase of PCT Patent Application No. PCT/IT2016/000187 having International filing date of Jul. 28, 2016, which claims the benefit of priority of Italian Patent Application No. 102015000038644 filed on Jul. 28, 2015. The contents of the above applications are all incorporated by reference as if fully set forth herein in their entirety.

FIELD AND BACKGROUND OF THE INVENTION

The present invention relates to a biodegradable container or capsule.

More specifically, the invention relates to a biodegradable capsule or container for single dose or multi-dose administration of hot or cold beverages such as, for example, coffee, tea, herbal tea, carbonated beverages, etc.

At the state of the art are containers known for single dose or multi-dose administration, of beverages known as capsules, containing the necessary preparation of the desired beverage.

The capsules are used in particular machines for dispensing beverages (also said machines are known in the art).

The machines for dispensing beverages inject an under pressure fluid solution inside the capsule, said fluid crossing the preparation contained within the capsule itself, thus realizing the specific beverage.

Typically, for the realization and the dispensing of the beverage, a fluid solution is injected in the capsule at a pressure of about 20 atmospheres for a time ranging between 15 and 90 seconds.

Therefore, the capsules on the market are mainly comprised of mineral and synthetic origin materials such as, for example, aluminum and plastic, which guarantee to the capsule itself the necessary mechanical characteristics to withstand to mechanical stresses, and in particular to the pressure, to which it is subjected during the use.

As it is known, said capsules are of the disposable type and once used within a machine for dispensing beverages they become wastes difficult to dispose, namely caused by the materials of which they are composed.

They are also known at the present state of the art technique for food containers made of biodegradable material such as, for example, paper or other wood derivatives.

The biodegradability is the property of the organic substances to be naturally decomposed, or rather, to be decomposed by the saprophyte bacteria.

Particularly, a decomposable (or biodegradable) material is attacked by some bacteria that extract the necessary enzymes to the decomposition into simple products, so that the element can be completely absorbed by the environment.

Therefore, the biodegradable containers, comprised for example of pressed paper, are easy to be disposed of. However, they do not have mechanical characteristics suitable to be used in machines for dispensing beverages, in particular for the use of a pressurized fluid solution.

SUMMARY OF THE INVENTION

In view of the above, the present invention aims to overcome the above mentioned drawbacks, and, in particular, to provide a biodegradable container or capsule for single-dose or multi-dose administration of beverages having mechanical characteristics suitable for use with machines for dispensing beverages.

It is therefore specific object of the present invention a biodegradable container for single dose or multi-dose administration of beverages by injecting a fluid solution, under pressure through a preparation, said biodegradable container comprising:

a tubular body having a side wall, a first opening, and a second opening, opposite to said first opening, a first surface coupled to said tubular body in correspondence of said first opening, said tubular body and said first surface forming a chamber for containing said preparation; and a second surface coupled to said tubular body in such a way as to obstruct said second opening and prevent the escape of said preparation, said biodegradable container comprising reinforcement means associated with said side wall, and configured to oppose resistance to pressure acting on said biodegradable container during the injection of said fluid solution under pressure.

Preferably, according to the invention, said pressure acts on the biodegradable container from inside and/or from outside of said biodegradable container.

Particularly, according to the invention, said reinforcing means can externally wraparound said side wall and preferably further wrap said first surface and/or said second surface.

More particularly, according to the invention, said side wall and/or said first surface and/or said second upper surface, may have notches for housing said reinforcing means.

Furthermore, according to the invention, said side wall can be comprised of multilayer material, and said reinforcing means can be contained between two layers of said multilayer material, externally wrapping at least one layer of said side wall.

Still according to the invention, said reinforcing means can be made by at least one biodegradable thread-like element or at least one biodegradable strip spirally wound around said side wall, starting from an area adjacent to said first or second opening up to said second or first surface, said at least one thread-like element or said at least one strip containing the expansion of said side wall during the injection of said pressurized fluid solution in said biodegradable container.

More specifically, according to the invention, said reinforcing means can be realized by using biodegradable gauze or a biodegradable sock, for containing the expansion of said side wall, and preferably said first surface, and/or of said second surface, during the injection of said pressurized fluid solution in said biodegradable container.

In particular, according to the invention, said side wall can have a plurality of longitudinal folds.

More in particular, according to the invention, said container may have an anti-grease and waterproofing treatment on the inner surface, and/or external.

Furthermore, according to the invention, said first surface may have a plurality of holes for dispensing said beverage during the injection of said fluid solution under pressure in said container.

Still according to the invention, said biodegradable container may comprise a biodegradable filter, arranged inside said container and in proximity to said first surface and/or said second surface, for filtering said beverage and preventing the escape of said preparation during the injection of said under pressure fluid solution in said biodegradable container.

More specifically, according to the invention, said biodegradable container may comprise a biodegradable end plate disposed internally or externally with respect to said container and in proximity to said first surface, said end plate being configured to improve the mechanical strength of said first surface and to adjust the amount of said preparation that can be inserted inside said container by reducing, or increasing, its thickness, so as to reduce, or increase, the useful volume of said container.

More in detail, according to the invention, said first surface may be comprised of multilayer material, and said end plate can be contained between two layers of said multilayer material.

Particularly, according to the invention, said biodegradable container may comprise a biodegradable outer ring, arranged externally with respect to said container and close said second opening, for the coupling between said biodegradable container and said second surface.

More particularly, according to the invention, said second surface may have one or more micro-holes for the passage of said pressurized fluid solution.

According to a further embodiment of the biodegradable container according to the invention, said reinforcing means, when internal, can be elements, preferably spike elements, arranged inside said tubular body, transversely with respect to said side wall and/or transversely with respect to said first and second surfaces, preferably it can be provided a plurality of spikes, preferably 2, 3, or 4, or a higher number, arranged according to a cross arrangement inside said body, possibly partially or completely extending to the inner height of said body, and possibly provided with openings on their wall.

Furthermore according to the invention, said first and/or said second surface may preferably be comprised of an upper pre-engraved cardboard or, alternatively, pre-drilled, and/or one or more layers of paper, preferably paper of 40 g/sqm, and/or by a filter paper layer.

Furthermore, according to the invention, said first surface can be shaped.

Still according to the invention, a core can be provided upperly tightened by tightening rings of the second surface.

Always according to the invention, it can be provided at least one seal in correspondence of the first surface of said container.

Furthermore, according to the invention, the reinforced skirt and/or the second surface can be realized separately with respect to the tubular body, and then assembled.

Further, according to the invention, there can be provided a perforable valve in correspondence of said second surface.

Preferably, according to the invention, it can be provided, in correspondence of said second surface, a track module, directing evenly the water over the entire section to be emulsified, and/or at said first surface, a labyrinth passage to improve the creaminess of the beverage, or vice versa.

Still according to the invention, said first surface and/or said second surface can be a flat sheet of biodegradable material having a peripheral edge folded together or with respect to a respective end portion of said tubular body so as to close the relative opening.

Always according to the invention, said peripheral edge may be bent, preferably together with said end portion of said tubular body, in contact with said first surface or said second surface or with said side wall of said tubular body.

Particularly, according to the invention, said peripheral edge can be externally or internally folded in contact with said side wall of said tubular body and said end portion of said tubular body can be internally or externally folded in contact with said first or second surface.

Preferably according to the invention, said peripheral edge can be curly wrapped together with the corresponding end portion of said tubular body in contact with said side wall or with said second or first surface forming a curl edge.

Furthermore according to the invention, it can be provided for a biodegradable material core internally with respect to said curl edge.

Still according to the invention, said peripheral edge can be coupled to said tubular body by mechanical coupling, preferably embossing, or by using adhesives or by heat sealing.

Finally, it is an object of the present invention an assembly comprising a biodegradable container, as described in the above, and an additional element to be associated in correspondence with said first surface of said biodegradable container, said additional element comprising a labyrinth passage for the forced passage of said beverage from said biodegradable container, and at least one opening connected to said labyrinth passage, for dispensing said beverage.

Still according to the invention, said additional element can comprise a first outer layer, a second intermediate layer in fluid connection with the first layer, and a third layer in fluid connection with the second layer or with said opening, and said labyrinth path may be disposed on said first layer and/or on said third layer.

BRIEF DESCRIPTION OF THE SEVERAL VIEWS OF THE DRAWINGS

The invention will be now described for illustrative, but not limitative purposes according to its preferred embodiments, with particular reference to the figures of the enclosed drawings, wherein:

FIGS. 7a and 7b show section front views of the container of FIG. 1 taken along the plane IV-IV' of FIG. 3 during the coupling steps of the base to the container body;

FIG. 8 shows an isometric section view of a second embodiment of the capsule according to the invention;

FIG. 9 shows an isometric section view of a third embodiment of the capsule according to the invention;

FIG. 10 shows an isometric section view of a fourth embodiment of the capsule according to the invention;

FIG. 14 shows an isometric section view of an eighth embodiment of the capsule according to the invention;

FIG. 15 shows an axonometric sectional view of a ninth embodiment of the capsule according to the invention;

FIG. 16 shows an axonometric view of a tenth embodiment of the capsule according to the invention;

FIG. 17 shows an axonometric sectional view, partially exploded, of an eleventh embodiment of the capsule according to the invention;

FIG. 18 shows an axonometric sectional view, partially exploded, of a twelfth embodiment of the capsule according to the invention;

FIG. 19 shows an axonometric sectional view of a thirteenth embodiment of the capsule according to the invention;

FIG. 20 shows an axonometric sectional view of a fourteenth embodiment of the capsule according to the invention;

FIG. 31 shows a front elevation section view of a twentieth embodiment of the container according to the invention;

FIG. 32 shows a front elevation section view of the upper portion of a twenty-first embodiment of the container according to the invention;

FIG. 33 shows a front elevation section view of the lower portion of a twenty-second embodiment of the container according to the invention;

FIG. 34 shows a front elevation section view of the lower portion of a twenty-third embodiment of the container according to the invention;

FIG. 35 shows a front elevation section view of the lower portion of a twenty-fourth embodiment of the container according to the invention;

FIG. 36 shows a front elevation section view of the lower portion of a twenty-fifth embodiment of the container according to the invention; and FIG. 37 shows a front elevation section view of the lower portion of a twenty-sixth embodiment of the container according to the invention.

DESCRIPTION OF SPECIFIC EMBODIMENTS OF THE INVENTION

Making reference to the FIGS. 1-6, it is noted a biodegradable container or capsule according to the invention, in a first embodiment, indicated by the reference number 1.

Figure 4:
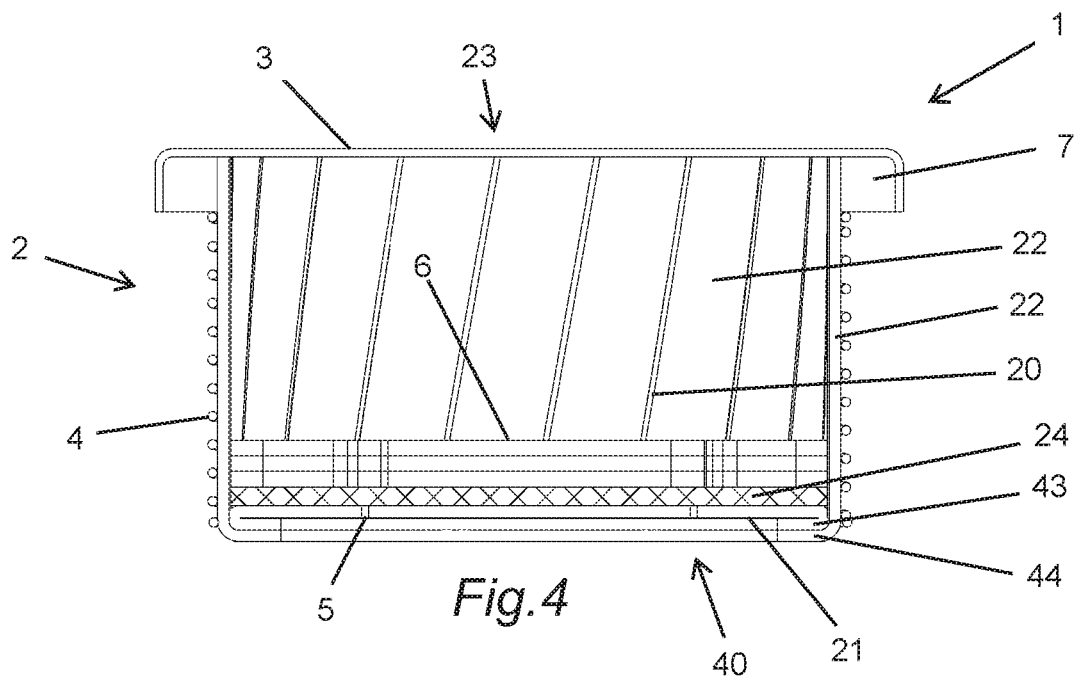
FIG. 4 shows a front view in diametral section of the container of FIG. 1 taken along the plane IV-IV' of FIG. 3.

As shown in FIG. 4, said biodegradable container or capsule 1 comprises a tubular body 2, having a side wall 22, an upper opening or first opening 23 and a lower opening or second opening 40, opposite to said upper opening 23. Said container 1 also comprises a first surface or base portion 21 disposed in correspondence with said lower opening 40 of said tubular body 2 to close the same, thus realizing a chamber for containing a preparation (not shown in the figure) necessary to the preparation of the desired beverage (coffee, tea, herbal tea, etc.).

Furthermore, said biodegradable container 1 comprises a second surface or upper portion 3, particularly an upper filter 3, comprised of biodegradable material e.g. filter paper, or environmentally friendly material with polylactic acid fibers, which is coupled to said tubular body 2 in correspondence of said upper opening 23, once the container 1 has been filled with said preparation, so as to completely occlude said upper opening 23 preventing, therefore, the leakage of said preparation from said container 1.

Furthermore, said upper filter 3 is permeable to the fluid solution, and allows the injection of the same inside said body 2 for the realization and the delivery of the beverage.

Figures 3A, 3B:
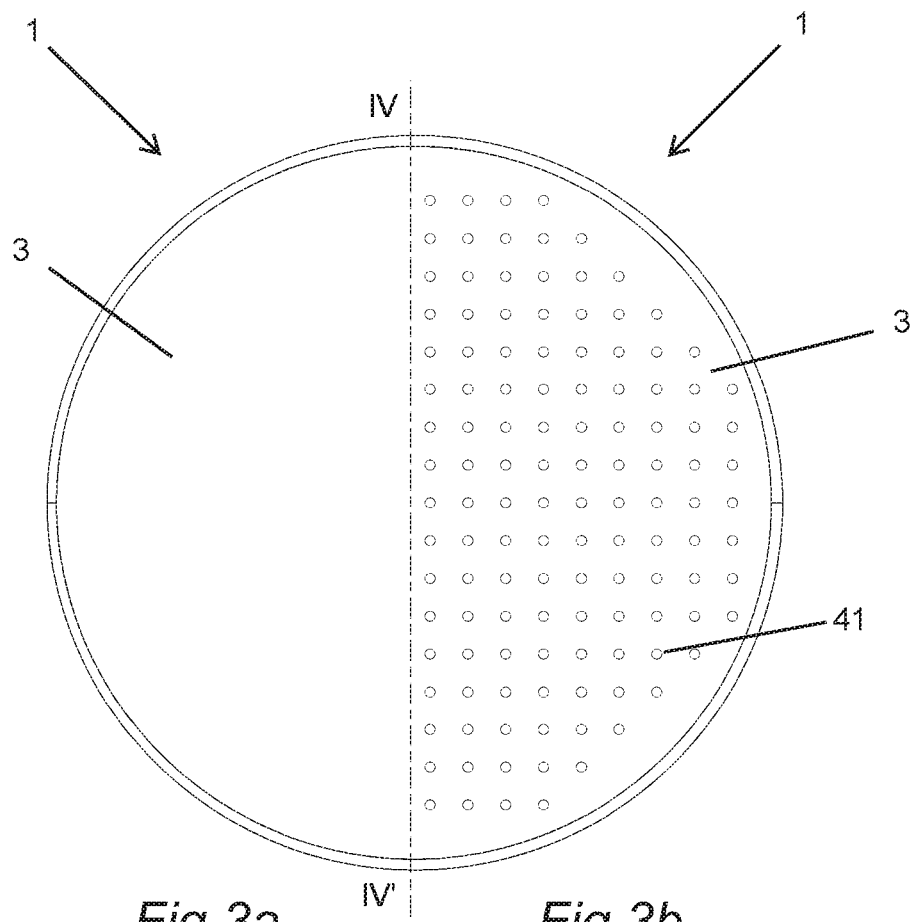
FIG. 3a shows a partial top view of the container of FIG. 1.
FIG. 3b shows a partial top view of an upper portion of a variant of the container of FIG. 1.

In order to facilitate this operation, as shown in FIG. 3b, said upper filter 3 can have micro holes 41.

Said container 1 is comprised of biodegradable material e.g. paper, or environmentally friendly material with polylactic acid fibers, pressed paper, cardboard, pressed cardboard, cotton, natural fabrics, or other wood derivatives, and can be realized by a single layer material, or by a multilayer material comprising, for example, a first inner layer of paper with basis weight of 100 g/m2, and a second outer layer of paper with a basis weight of 110 gr/m2.

Furthermore, said container 1 can have internally and/or externally an anti-grease and waterproofing treatment on the surface for different embodiments.

Said treatment is not instead present on the outer surface of said tubular body 2, for different embodiments, which is therefore couplable, by non-toxic glues, or by heat-sealing, with other elements comprising said biodegradable container or capsule 1.

In the specific embodiment, said tubular body 2 has a cylindrical shape, but in other embodiments it can have other shapes, for example a conical shape, and can be realized by winding one or more flat sheets on themselves. For example, the tubular body 2 can be obtained by a multi-layer material, as shown in the embodiment of FIG. 14.

As shown in FIGS. 7a and 7b, the coupling between the tubular body 2 and the bottom portion 21 is obtained by inserting inside the tubular body 2, through the lower opening 40, the base portion 21 comprised of a biodegradable material flat sheet, with the peripheral edge 43 folded outward, so as to leave a lower portion 44 of the tubular body 2 free. Then, the peripheral edge 43 of the bottom portion 21 and the lower portion 44 of the tubular body 2 are folded together on themselves towards the bottom portion 21, closing the lower opening 40 of the container 1.

Preferably, the bottom portion 21 and the tubular body 2 are coupled each other by mechanical coupling, for example embossing, or by gluing, using an adhesive or by heat sealing.

Said closure system can also be used to close the upper portion 3 of the container 1 according to the invention. In the embodiments shown in FIGS. 31-37, there are shown other alternative systems for closing the openings 23 or 40 of the container 1 that can be applied alternatively to one or both openings, and that will be described later.

Finally, said biodegradable container or capsule 1 according to the invention has reinforcement means 4 associated to said side wall 22 and configured to resist to the pressure acting on said biodegradable container 1 during the injection of said pressurized fluid solution.

Particularly, in the embodiment shown in FIGS. 1-6, said reinforcement means 4 are placed around said side wall 22.

Said reinforcement means 4 confer to said biodegradable container or capsule 1 the mechanical strength characteristics necessary to withstand to the stresses, particularly to the pressure, to which it is subjected during the use inside said beverage dispensing machines.

Particularly, said reinforcement means 4 are a filiform element comprised of biodegradable material, e.g. cotton, flax or ramie spirally wound about said side wall 22, starting from an area adjacent to said upper opening 23 up to said base portion 21 or vice versa.

Thus, said filiform element 4 allows to contain the expansion of said biodegradable container or capsule 1, and particularly of the side wall 22 of said tubular body 2, while dispensing a beverage, since it is subjected to the pressure of the fluid solution.

Said filiform element 4 can be coupled to said body 2 according to procedures known in the art.

For example, said filiform element 4 can be coupled to said body 2 by means of an initial knot (not shown in the figure), inside said tubular body 2, and a final knot (not shown in the figure), which is also inside said tubular body 2, or can be coupled to said tubular body 2 by gluing using non-toxic glues, or by another mechanical coupling, or by heat sealing, particularly comprised of ecological material having PLA (polylactic acid) fibers, ecological and heat-sealable natural product, or by a combination of them.

Still, said side wall 22 of said tubular body 2 can have seats (not shown in the figure) whose purpose is to house said filiform element 4.

Again, as shown in FIG. 16, said reinforcement means 4 can be a biodegradable material band or strip 4, preferably paper material, spirally wrapped so as to cover said side wall 22 of said tubular body 2 or all the container 1.

In further embodiments, said reinforcement means may comprise a plurality of strips 4 spirally wrapped on said body 2. Moreover, in further embodiments said one or more bands 4 are spirally wound on themselves or one above the other so as to form a plurality of reinforcement layers.

Said one or more bands 4 may be glued by the whole surface of said tubular body 2, preferably with non-toxic glues, or the glue can be applied only at the two ends of the band 4, arranging in correspondence of the top and the bottom of said tubular body 2 or of said container 1. Alternatively, it can be fixed by means of heat sealing or by mechanical means.

Figure 12:
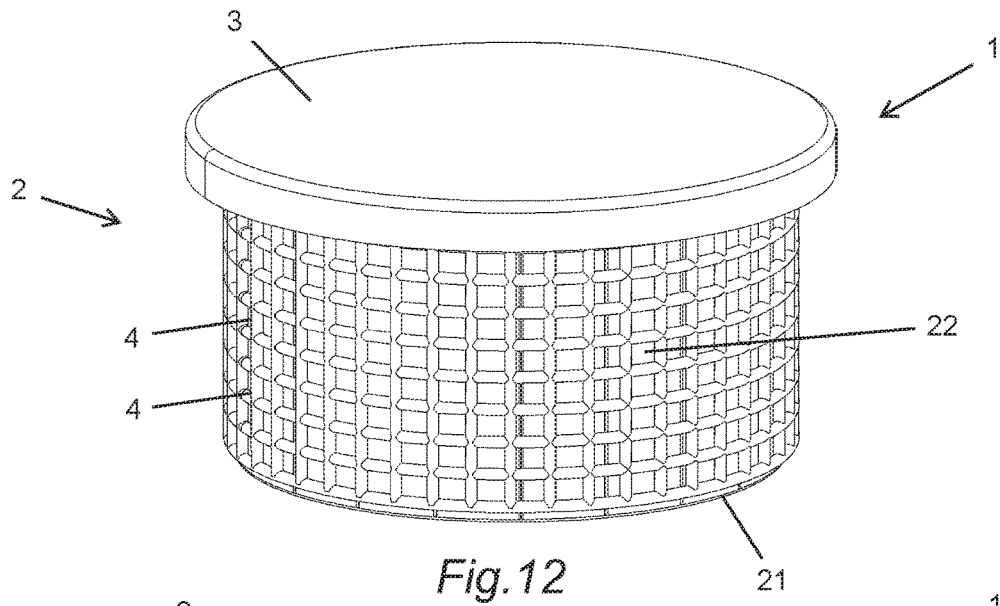
FIG. 12 shows an axonometric view of a sixth embodiment of the capsule according to the invention.
Figure 13:
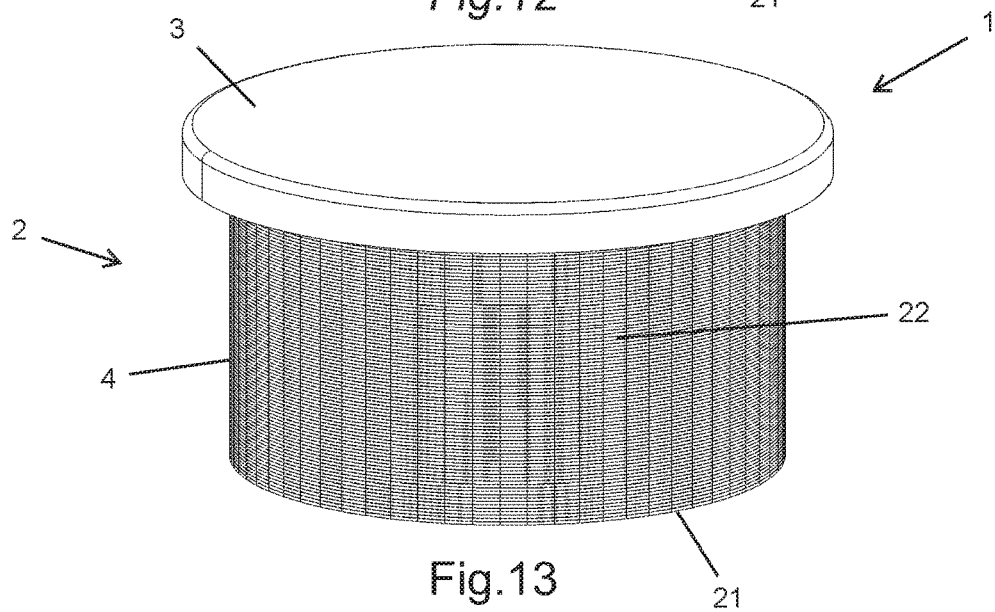
FIG. 13 shows an axonometric view of a seventh embodiment of the capsule according to the invention.

In other embodiments, as shown in FIGS. 12 and 13, said reinforcement means 4 can also be realized by means of a gauze, such as square mesh pattern gauze (FIG. 12), or by a sock wrapped around the tubular body 2 (FIG. 13), which can be coupled to said tubular body 2 by means of mechanical means, or, by gluing with non-toxic glues, or, taking advantage of their elasticity, they can wrap said tubular body 2 while simply remaining in position by friction or heat sealing.

Figure 1:
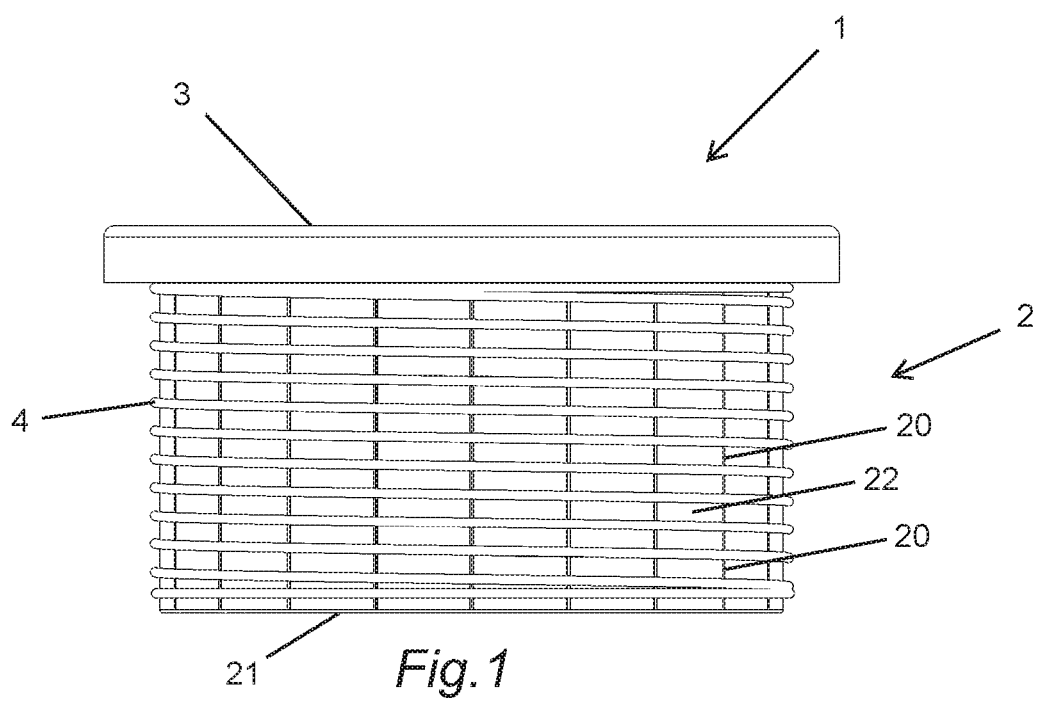
FIG. 1 shows a front view of the biodegradable container or capsule according to the invention in a first embodiment.
Figure 2:
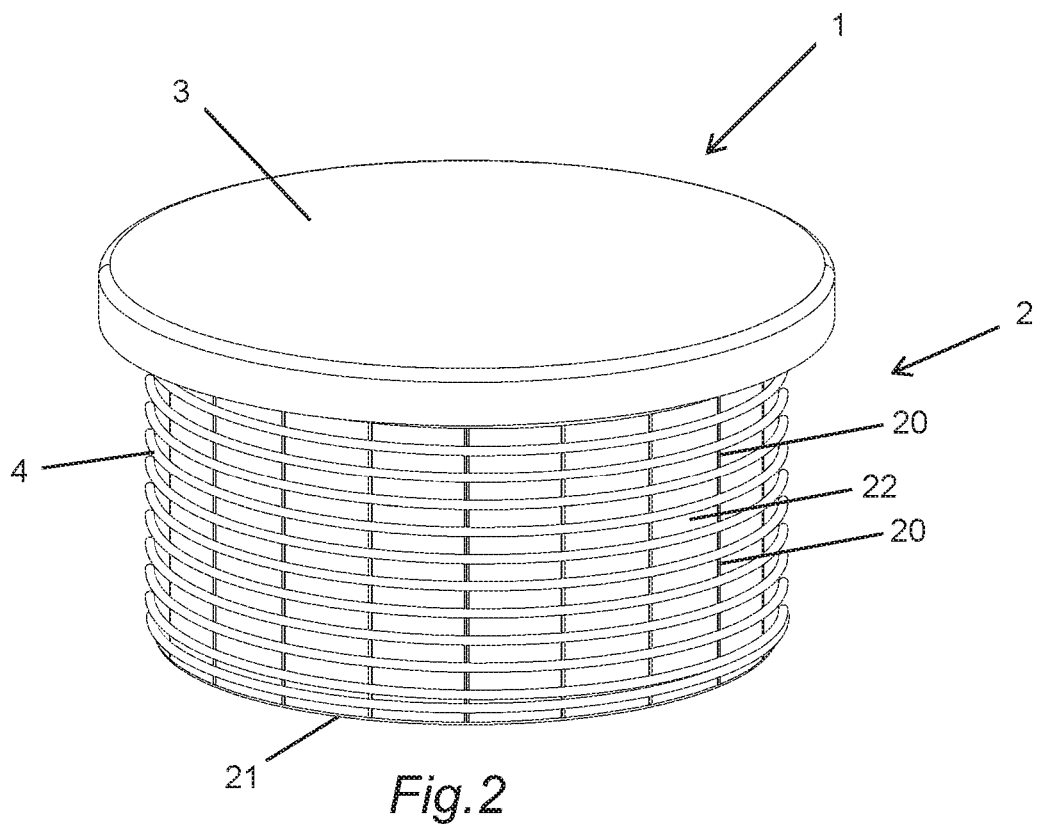
FIG. 2 shows an axonometric view of the container of the embodiment according to FIG. 1.
Figure 11:
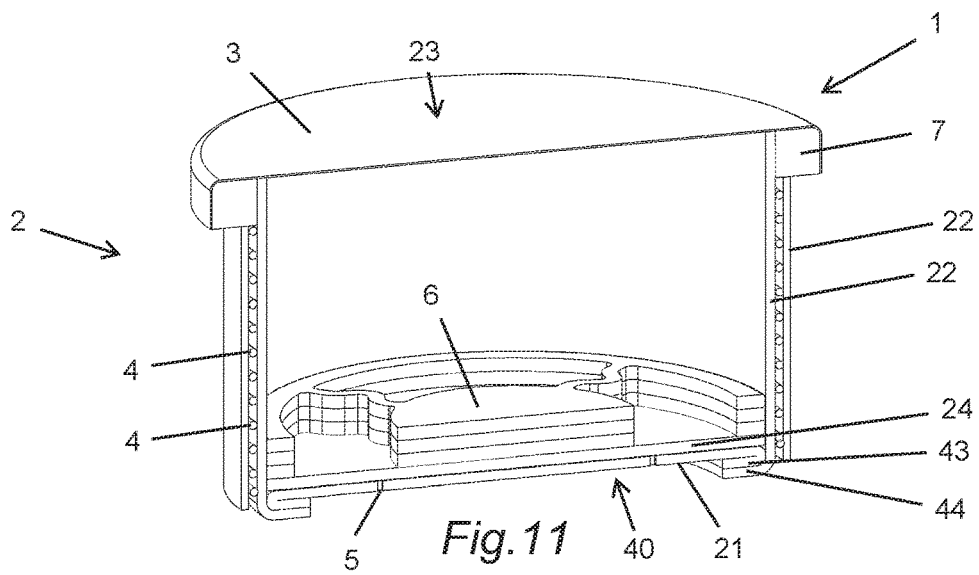
FIG. 11 shows an isometric section view of a fifth embodiment of the capsule according to the invention.

In other embodiments, as shown in FIG. 11, when said tubular body 1 is comprised of a multilayer material, said reinforcement means 4, it can be inserted between two layers of said multilayer material, thus realizing a sandwich type material. With reference to FIGS. 1 and 2, said tubular body 2 preferably has, in correspondence of its side wall 22, the longitudinal folds 20 to better shape said tubular body 2 and to more easily obtain a substantially cylindrical shape.

Furthermore, said longitudinal folds 20 confer a greater radial elasticity to said tubular body 2, useful to oppose to mechanical stresses such as, for example, the pressure generated by the fluid solution, in beverage dispensing machines.

Said tubular body 2 may be impermeable or permeable, depending on the desired type of use.

Particularly, in the permeable arrangement, the fluid solution is injected inside said biodegradable container or capsule 1, passes through said preparation, and flows out from the whole surface of said body 2.

This solution is particularly suitable for "long" type beverages.

Figure 5:
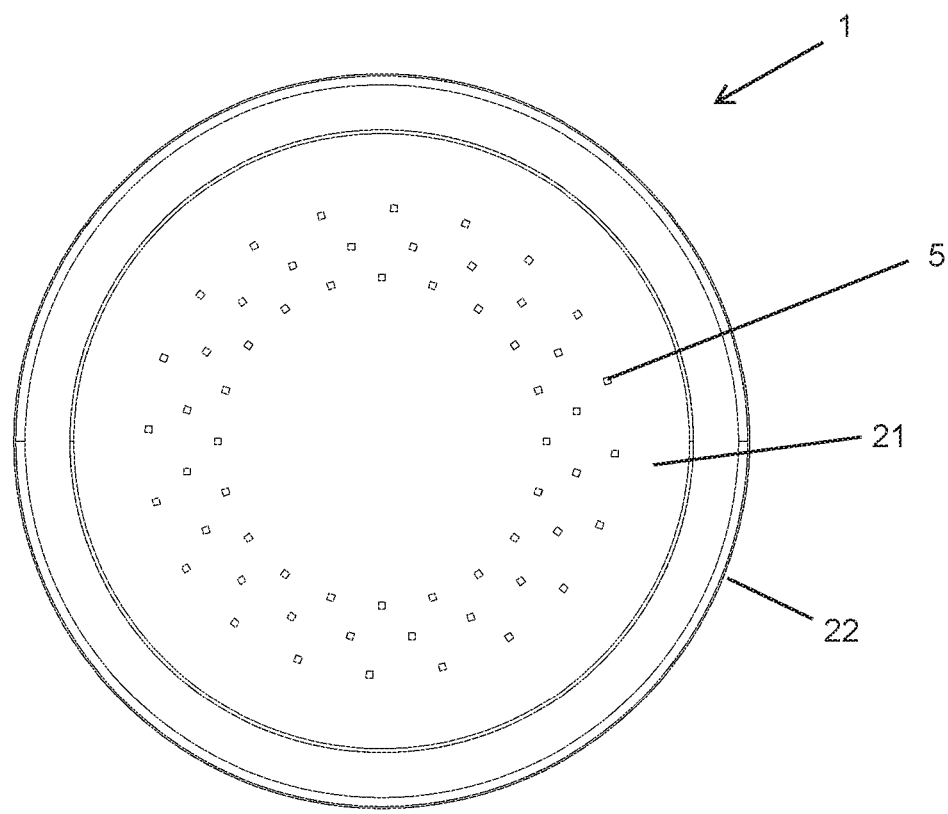
FIG. 5 shows a bottom view of the container of FIG. 1.

On the contrary, in the waterproof arrangement, the fluid solution is injected inside said biodegradable container or capsule 1, passes through the preparation, and projects from a plurality of holes 5, shown in FIG. 5, suitably realized in said base portion 21.

This solution is particularly suitable for beverages of the "concentrated" type.

By way of example, said plurality of holes 5 may be comprised of sixty holes, each having a diameter of 0.75 mm.

Figure 6:
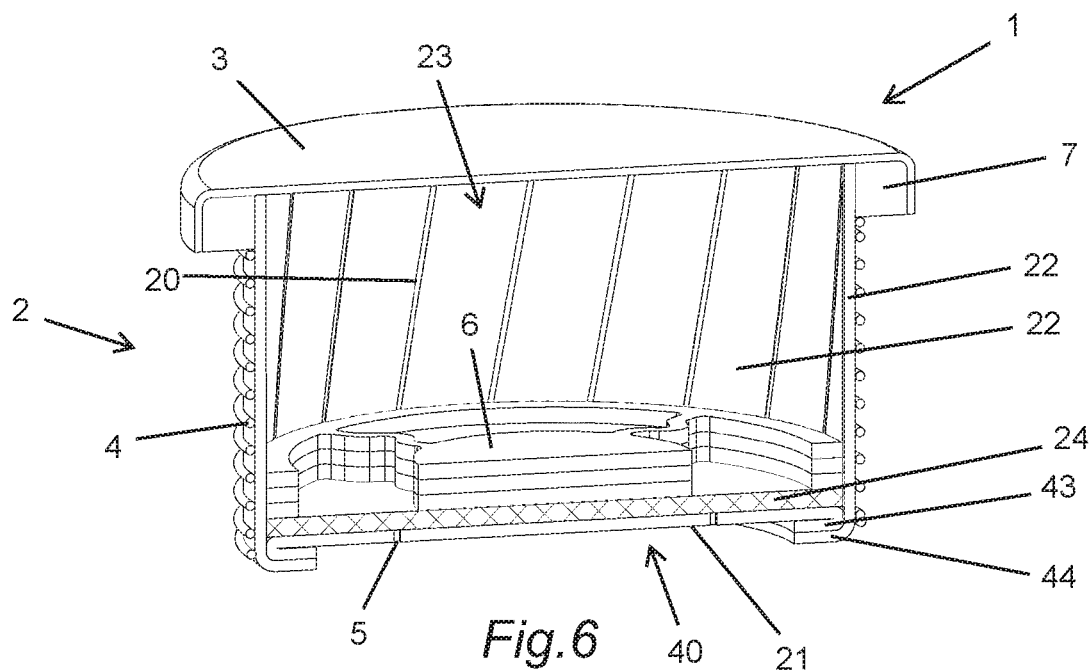
FIG. 6 shows a perspective view in section of the sectioned container of FIG. 4.

Making reference to FIGS. 4 and 6, said tubular body 2 may contain an end plate 6, improving the mechanical strength of said base portion 21.

In addition, said end plate 6 allows to adjust the amount that can be introduced of said preparation inside said tubular body 2 by reducing, or increasing, its thickness, so as to reduce, or increase, the useful volume of said tubular body 2.

Said end plate 6 is also comprised of biodegradable material such as, for example, paper, or paper with polylactic acid fibers, pressed paper, paperboard, cardboard, plywood, or other wood derivatives, and can be simply resting on said base portion 21 or mechanically coupled to it, for example, by non-toxic glue, by welding or by other mechanical couplings.

Said end plate 6 may be coupled internally (as shown in the figures) or externally (not shown) to said base portion 21, always fulfilling the same function.

In case the base portion 21 is comprised of multilayer material (as shown for example in FIG. 15), said end plate 6 can be inserted in correspondence of said base portion 21 between two layers of the multilayer material.

Furthermore, making reference to FIG. 15, in case the base portion 21 has said plurality of holes 5, said end plate 6 may also have a plurality of holes 5. Particularly, when the base portion 21 is comprised of said multi-layer material, said end plate 6 can be inserted between the layers of said base portion 21, as shown in FIG. 15.

Furthermore, making reference to FIGS. 6 and 8-11, in case the base portion 21 has said plurality of holes 5, said end plate 6 may have a shape that does not interfere with said plurality of holes 5.

Still referring to FIGS. 4 and 6, to prevent the leakage of said preparation through said plurality of holes 5 of said end plate 6 and/or said plurality of holes 5 of said base portion 21, a lower filter 24 may be provided, comprised of biodegradable material, for example, filter paper, placed between said preparation and/or said end plate 6 and/or said base portion 21, so as to filter the beverage during the dispensing phase of the same, and to hold said preparation inside said container 1.

Further, said lower filter 24 plays a "controller" role of the beverage dispensing flow.

Still making reference to FIGS. 4 and 6, the biodegradable container or capsule 1 can have an outer ring 7 placed in correspondence of said upper opening 23 and externally to said side wall 22 of said tubular body 2.

The coupling between said outer ring 7 and said tubular body 2 is realized, for example, by gluing with nontoxic glues, or heat sealing, or other mechanical couplings, as shown, by way of example, in FIGS. 6 and 8-15.

Said outer ring 7 is comprised of biodegradable material such as, for example, paper, pressed paper, ecological material with polylactic acid fibers, multi-layer paper, cardboard, pasteboard, parchment, stratification of vegetable parchment, plywood, or other wood derivatives, and allows to correctly position said biodegradable container or capsule 1 into a machine for dispensing beverages, in addition to facilitating the subsequent ejection operation.

Furthermore, said ring 7 makes it easier the coupling between said biodegradable container or capsule 1 and said upper part 3, in particular said upper filter 3.

In another embodiment, as shown in FIG. 9, said biodegradable container or capsule 1 can have an inner ring 8 positioned in correspondence of said upper opening 23 and inside said tubular body 2, having the function of improving the mechanical features of said biodegradable container or capsule 1 and to facilitate the coupling operations between said tubular body 2, said outer ring 7 and said upper filter 3.

Making reference to FIG. 8, it is noted an isometric section view of a second embodiment of said biodegradable container or capsule 1, where said outer ring 7 is realized folding on itself, i.e., as an "accordion", said side wall 22 of said tubular body 2 forming a plurality of transverse folds, and receiving said upper filter 3 in one of said internal transverse folds of said side wall 22.

Making reference to FIG. 9, it is observed an isometric section view section of a third embodiment of said biodegradable container or capsule 1, where said outer ring 7 is realized by bending said side wall 22 radially around said reinforcement inner ring 8, where said upper filter 3 is fixed, by gluing or mechanical coupling or heat-sealing, between said reinforcement inner ring 8 and said side wall 22.

Making reference to FIG. 10, there is shows an isometric section view of a fourth embodiment of said biodegradable container or capsule 1, where said tubular body 2 is fixed by the "Swiss frame system", by turning the upper edge of said side wall 22 outside around said inner ring 8 and fixing the whole with said outer ring 7, which clamps said inner ring 8 and said edge of said side wall 22, where said upper filter 3 is fixed, by a glue or mechanically, between said outer ring 7 and said side wall 22 folded on said inner ring 8.

Observing now FIG. 17 of the enclosed drawings, there is shown an eleventh embodiment of the biodegradable container or capsule 1 according to the invention, designed in particular for cases in which the pressure on the biodegradable container 1 is applied from the outside either of the fluid-dynamic type or of the mechanical type.

In this case, the reinforcement means act from inside of said container 1 and are means of a cross reinforcement 42 provided transversely with respect to the surfaces 21 and 3, which, in the embodiment shown, has six spikes, but which can also be realized by two, three or four, five, or more spikes. Moreover, always in the embodiment shown, said spikes of the reinforcement means 42 extend for the whole height of the biodegradable container or capsule 1, but it is to be understood that they can also extend only partially with respect to the height of the biodegradable the container 1.

Furthermore, said spikes of the reinforcement means 42 have internal openings 25, for the passage of the product inside the biodegradable container or capsule 1.

The upper part 3 and/or said lower surface 21 may be made up of an upper pre-engraved or, alternatively, pre-drilled, cardboard 3', and/or of a layer of paper 3", particularly from 40 gr/smq, and/or by a filter paper layer 3'''.

Observing now FIG. 18, in this case, as in the embodiments illustrated in the following figures, there are provided both internal and external reinforcement means 42, 4.

In the embodiment shown in FIG. 18, by inserting PLA fibers, polylactic acid (natural and compostable material), or other weldable ecological materials, it is possible welding the filter paper 3 to the other parts of the capsule 1 body, in a more internal position to make room for the shutter gasket compressing the capsule 1 and perfectly adhering to the head of the same capsule 1.

Furthermore, as shown in FIG. 18, the side wall 22 of the tubular body 2 can be folded towards the outside of a biodegradable material ring 7, preferably layered paper with non-toxic glues or other type of coupling, acting as a reinforcement and a guide while loading the biodegradable container or capsule 1 at the basis of the dispensing machine. Specifically, the ring 7 is preferably obtained by means of the horizontal layering of a plurality of paper sheets, or by radial stratification of more turns of paper, as if it were a pipe section.

Coming now to observe FIG. 19, on the head of the capsule 1, the upper edge of the side wall 22 of the tubular body 2 turns around a core (wire) 26 and is tightened by two rings, one inner ring 27 and one outer ring 28, making pressure each other with the fold of the body 2 of the capsule 1 placed between them. Obviously, this fold will remain above the collar of the capsule 1 head, also acting as head seal.

In the embodiment shown in FIG. 20, on the basis of tests carried out, it has been noted that it would be better to place a seal 29, or more than one seal, being a part of the body 2 of the capsule 1, above the head of the same, placed inside a seat realized during in the manufacturing step, or only glued or mechanically fixed, or comprised of the same material of the same head, to ensure a better top sealing.

Figure 21:
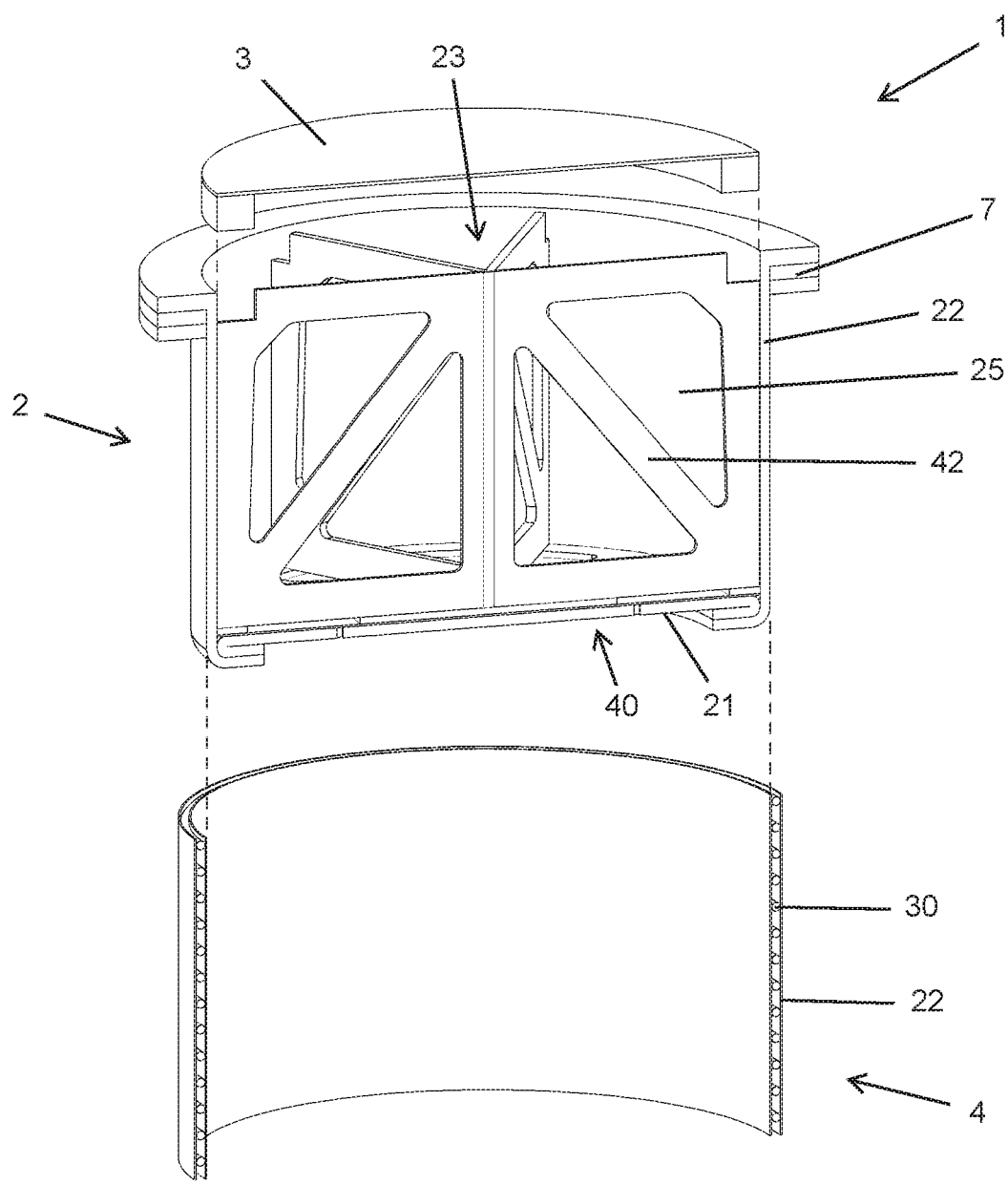
FIG. 21 shows an axonometric sectional view, partially exploded, of a fifteenth embodiment of the capsule according to the invention.

Coming now to observe FIG. 21, it shows the possibility of realizing the reinforcement means 4 separately by means of a skirt 22 reinforced by two layers of paper or fabric and an inner spiral 30, or circles, or gauze or extra-sandwich thread band, so that it is industrially easier to apply the skirt 22 without subsequently realize the reinforcement directly on the tubular body 2 of the capsule 1. The same arrangement can be implemented separately realizing the filter paper 3 and inserting it within the capsule 1 under a set pressure during the last assembly step of the capsule 1, along an industrial line.

Observing now FIGS. 22-25, there are illustrated further preferred embodiments of the capsule 1 according to the invention.

Figure 22:
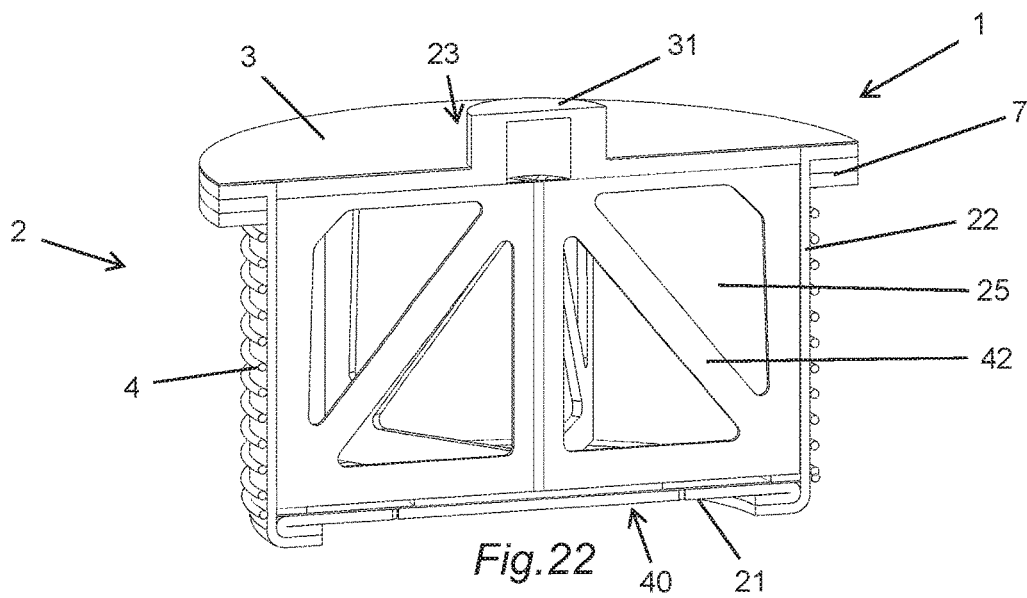
FIG. 22 shows an axonometric sectional view of a sixteenth embodiment of the capsule according to the invention.

Particularly, in the embodiment of FIG. 22, a valve 31 is provided at the top, in correspondence of the upper opening 23, which in some specific arrangements, is pierced by one or more injecting needle from which the water comes out at a temperature sufficient to make the infusion.

Figure 23:
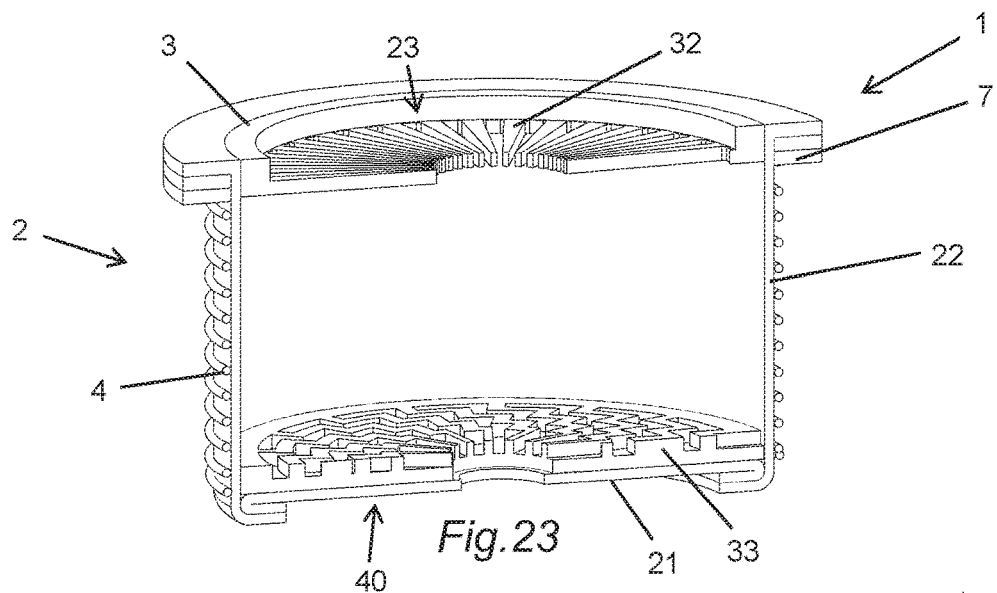
FIG. 23 shows an axonometric sectional view of a seventeenth embodiment of the capsule according to the invention.

In the embodiment of FIG. 23, there are provided the upper part in correspondence of the upper opening 23, a track module 32, directing the fluid evenly on the entire section of the preparation to be emulsified, and/or inferiorly, in correspondence of the lower opening 40, a labyrinth passage or bubble-breaking 33 to improve the creaminess of the beverage, but their position could be inverted, or may be provided only one of the two.

Said labyrinth passage 33 comprises a plurality of fluid flow channels, where the fluid is obliged to pass, in which the path of each channel can have different shapes (as also shown in FIGS. 26-30).

Figure 29:
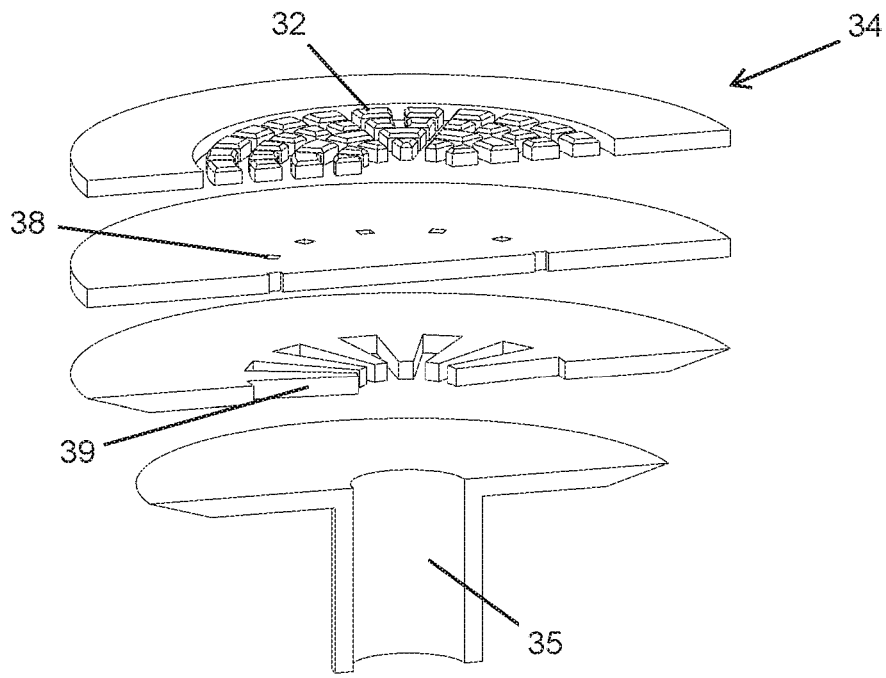
FIG. 29 shows an axonometric exploded sectional view, of a fourth embodiment of an additional element for the capsule according to the invention.
Figure 30:
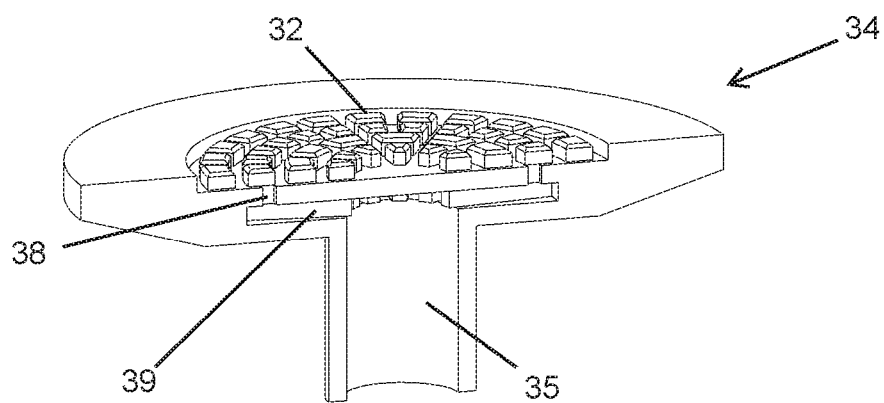
FIG. 30 shows an axonometric section view of the additional element of FIG. 29.

Moreover, the upper portion of the elements realizing the labyrinth passage 33 may be beveled to facilitate the sliding of the beverage (as also shown in FIGS. 29 and 30).

Figure 24:
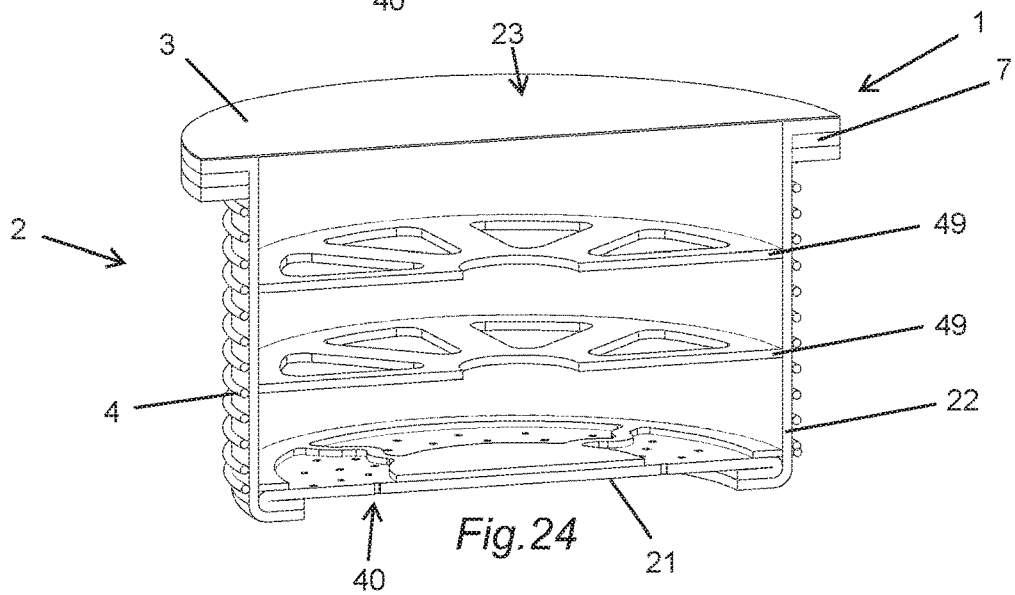
FIG. 24 shows an axonometric sectional view of an eighteenth embodiment of the capsule according to the invention.

In the embodiment of FIG. 24, there are shown the internal reinforcements 49 that can be provided transversely with respect to the side wall 22 of the tubular body 2.

It is obvious that it is possible simultaneously providing horizontal or vertical or transverse and longitudinal reinforcements.

The present embodiment has the advantage of being simple and quick to produce, always ensuring excellent mechanical strength characteristics, necessary to withstand the stresses, in particular to the pressure, to which the container according to the invention is subjected during the use within machines for dispensing beverages.

Figure 25:
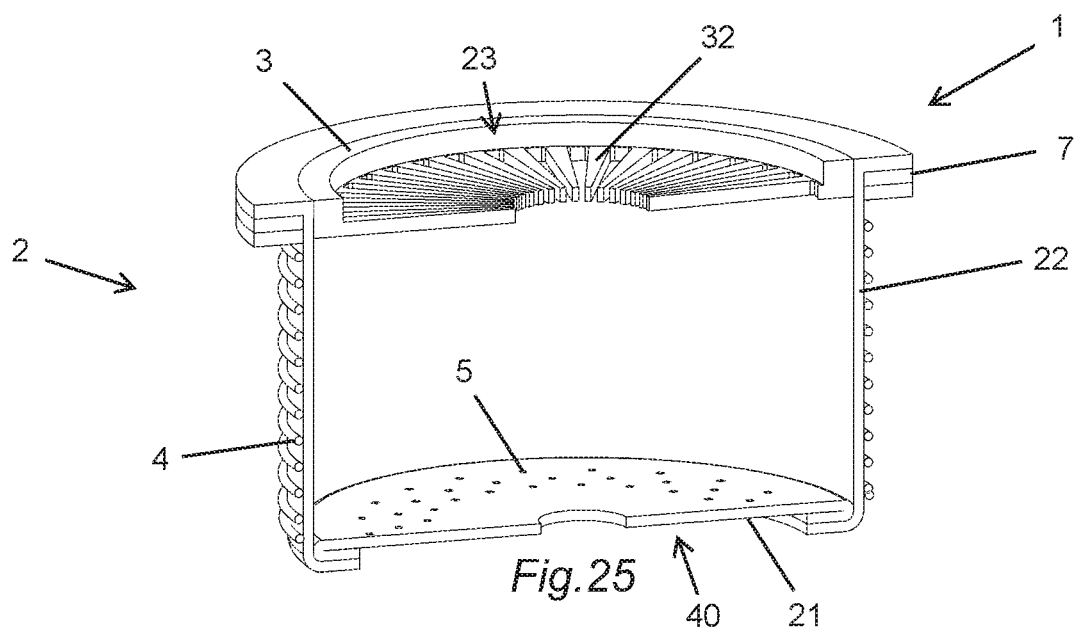
FIG. 25 shows an axonometric sectional view of a nineteenth embodiment of the capsule according to the invention.

In the embodiment of FIG. 25, there is provided, above, a track module 32, as described in the above, capable to direct the water evenly on the entire section to be emulsified, while inferiorly in correspondence of said base 21 said plurality of holes 5 is provided.

In order to improve the creaminess of the beverage obtained by passage through the capsule 1 of FIG. 25, it can be provided the use of an additional element or exterior plate 34 to be placed from the bottom of said capsule 1 in the device for dispensing the beverage, particularly in correspondence of its base portion 21.

Said additional element 34 comprises in its upper portion a labyrinth passage 33, as described in the above and as shown in FIGS. 26-29, and an opening, in particular a central channel 35, for dispensing the beverage after crossing the labyrinth passage 33.

Figure 26:
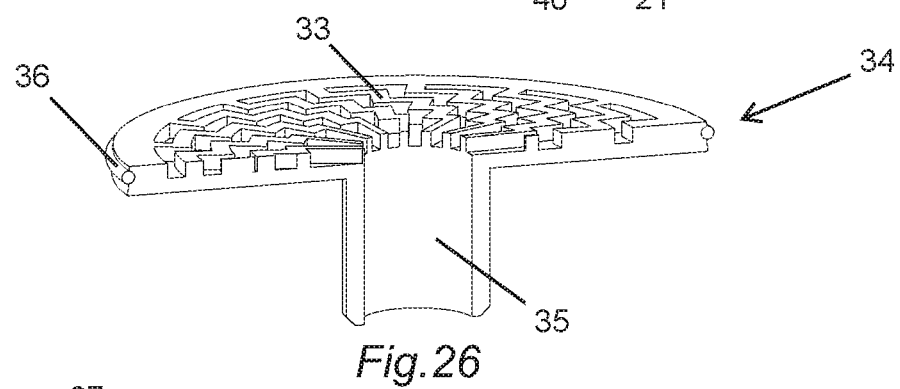
FIG. 26 shows an isometric section view of a first embodiment of an additional element for the capsule according to the invention.
Figure 27:
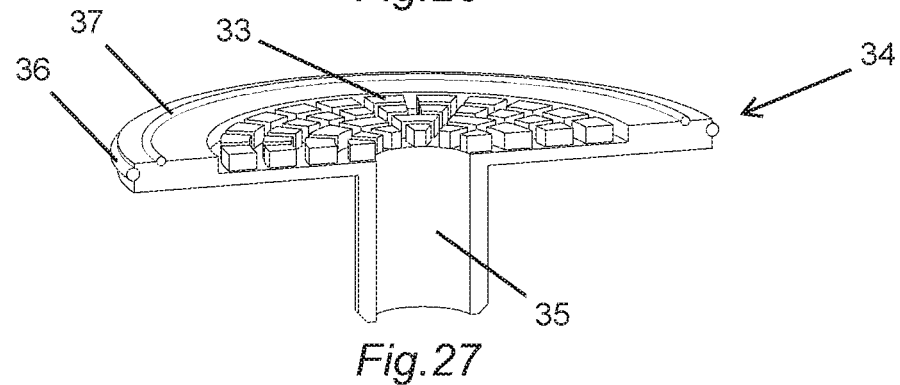
FIG. 27 shows an isometric section view of a second embodiment of an additional element for the capsule according to the invention.
Figure 28:
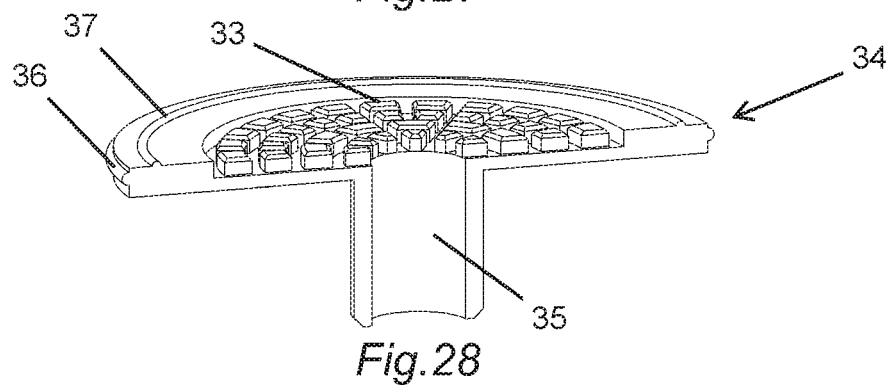
FIG. 28 shows an isometric section view of a third embodiment of an additional element for the capsule according to the invention.

Furthermore, said additional element 34 may provide a sealing element 36 in correspondence of the side surface of the upper portion (as shown in FIGS. 26-28) and/or a further sealing element 37, in correspondence of the upper portion of its upper surface.

Said sealing elements 36 or 37 can be external O-rings (as shown in FIGS. 26 and 27) or may be realized directly on the surface of the plate 34 (as shown in FIG. 28).

Said additional element 34, in its various embodiments, may be used in association with either one of the capsule 1 according to the invention or with other commercially available capsules, in order to improve the creaminess of the dispensed beverage.

Particularly, with reference to FIGS. 29 and 30 there is shown a fourth embodiment of the additional element 34, having a different stratification of the path of the beverage to be dispensed, and in particular a first outer layer comprising the labyrinth passage 32, formed from embossed bubble-breaking roughness, a second layer lower than the first one, comprising a plurality of vertical holes 38 where then the beverage penetrates, a third layer lower than the second one, comprising a plurality of compulsory slots or tracks 39, radially arranged in fluid communication with the center channel or spout 35 for the final delivery of the beverage.

Also, the third layer may include a plurality of further bubble-breaking protuberances to increase the creaminess of the product.

Alternatively, the first layer can become a mere collector of the beverage, then passing through the holes of the second layer, and then passes in the third layer comprising the labyrinth path.

Referring to FIGS. 31-37, there are observed different embodiments of the container 1 according to the invention, wherein there are provided different locking systems of the openings 23 and 40 of the container 1, e.g. applied to an upper opening 23 or a lower opening 40, but also applicable to the other.

Particularly, in the embodiment of FIG. 31, said container 1 has the upper part 3 comprised of a biodegradable material flat sheet having the peripheral edge 45 rolled up to curl towards the side wall 22 of the tubular body 2 together with the upper portion 46 of the body tube 2, thus forming a curled edge 48 so as to close the upper opening 23.

Preferably, as shown in FIG. 31, inside the curled edge 48 it can be provided a biodegradable material core 47 to increase its thickness.

Similarly to the described embodiment, the curled edge 48 can be turned towards the upper part 3 of the container 1, as shown in FIG. 32, so as to have the upper portion 46 of the tubular body 2 surrounding the peripheral edge 45 of the upper part 3.

In FIG. 33 there is shown a further variation of the closure of the openings 23 and 40 of the container 1 according to the invention, wherein, unlike the embodiment of FIGS. 7a-7b, the peripheral edge 43 of the bottom portion 21 is folded together with the lower end portion 44 of the tubular body 2 towards the side wall 22, so as to cover the end portion 44, closing the lower opening 40.

Preferably, as shown in FIG. 33, the reinforcement means 4 can also be applied on said folded edge 43 of the bottom portion 21.

Alternatively, as shown in the embodiment of FIG. 34, the peripheral edge 43 of the bottom portion 21 is folded on said end portion 44 of the tubular body 2. Or, as shown in FIG. 35, the end portion 44 of the tubular body 2 is internally folded onto said bottom portion 21.

Still referring to the embodiment of FIG. 36, the peripheral edge 43 of the bottom portion 21 can be folded inside the tubular body 2 to contact the end portion 44 of the side wall 22. Or, as shown in FIG. 37, the end portion 44 may be folded back externally on said bottom portion 21.

In the foregoing preferred embodiments have been described and variations of the present invention have been suggested, but it is to be understood that one skilled in the art can introduce modifications and changes, without departing from the relevant scope, as defined by the enclosed claims.

What is claimed is:

1. A biodegradable container (1) for single dose or multi-dose administration of beverages by injecting a fluid solution, under pressure through a preparation, said biodegradable container (1) comprising:
   a tubular body (2) having a side wall (22), a first opening (40), and a second opening (23), opposite to said first opening (40);
   a first surface (21) coupled to said tubular body (2) in correspondence of said first opening (40), said tubular body (2) and said first surface (21) forming a chamber for containing said preparation;
   a second surface (3) coupled to said tubular body (2) in such a way as to obstruct said second opening (23) and prevent the escape of said preparation, said biodegradable container (1) being characterized by comprising reinforcement means (4, 42, 49) associated with said side wall (22), and configured to oppose resistance to pressure acting on said biodegradable container (1) from inside and/or from outside of said biodegradable container (1) during the injection of said fluid solution under pressure, and in that said first surface (21) and/or second surface (3) is a flat sheet made of biodegradable material having a perimetral edge (43; 45) folded together or with respect to a respective end portion (44; 46) of said tubular body (2) in order to close the respective opening (40; 23); and a biodegradable end plate (6) arranged in proximity to said first surface (21) to enhance a mechanical strength of said first surface (21) and to adjust a preparation containing volume of said container (1).

2. The biodegradable container (1) according to claim 1, wherein said perimetral edge (43; 45) is folded together with said end portion (44; 46) of said tubular body (2), wherein said perimetral edge (43; 45) is in contact with at least one of said first surface (21), said second surface (3'''), and said side wall (22) of said tubular body (2).

3. The biodegradable container (1) according to claim 1, wherein said perimetral edge (43; 45) is externally or internally folded in contact with said side wall (22) of said tubular body (22) and in that said end portion (44; 46) of said tubular body (2) is internally or externally folded in contact with said first (21) or second (3) surface.

4. The biodegradable container (1) according to claim 1, wherein said perimetral edge (43; 45) is coiled together the corresponding end portion (46; 44) of said tubular body (2) in contact with said side wall (22) or with said second (3) or first (21) surface forming a coiled edge (48).

5. The biodegradable container (1) according to claim 1, wherein said perimetral edge (43; 45) is coupled to said tubular body (2) by at least one of mechanical coupling, embossing, adhesives, and heat-welding.

6. The biodegradable container (1) according to claim 1, wherein said reinforcement means (42, 49), are inside said tubular body (2), in a position transversal to at least one of said side wall (22) and first and second surface (21, 3).

7. The biodegradable container (1) according to claim 6, wherein said internal reinforcement means are a plurality of radial elements arranged in a cross to inside of said tubular body (2).

8. The biodegradable container (1) according to claim 6, wherein said internal reinforcement means (42, 49) partially or completely extend to the internal height of said tubular body (2).

9. The biodegradable container (1) according to claim 6, wherein said internal reinforcing elements (42, 49) have openings (25) on their wall, for the passage of the fluid solution within the biodegradable container (1).

10. The biodegradable container (1) according to claim 6, characterized in further comprising external reinforcing means (4) externally wrapped around at least one of said first surface (21), and said second surface (3).

11. The biodegradable container (1) according to claim 10, wherein said side wall (22) is comprised of a multi-layer material, and said external reinforcement means (4) are contained between two layers of said multi-layer material, thus wrapping from outside at least one layer of said side wall (22).

12. The biodegradable container (1) according to claim 10, wherein said external reinforcing means (4) are made by at least one biodegradable thread-like element or at least one biodegradable strip spirally wound around said side wall (22), starting from an area adjacent to at least one of first opening and second opening (40; 23) up to said second or first surface (3; 21), said at least one thread-like element or said at least one strip (4) containing the expansion of said side wall (22) during the injection of said pressurized fluid solution in said biodegradable container (1).

13. The biodegradable container (1) according to claim 1, wherein said side wall (22) has a plurality of longitudinal folds (20).

14. The biodegradable container (1) according to claim 1, wherein said container (1) has an anti-grease and water-proofing treatment on the inner and/or outside surface.

15. The biodegradable container (1) according to claim 1, wherein said first surface (21) and/or said second surface (3) has a plurality of holes (5; 41) for the passage of said fluid solution.

16. The biodegradable container (1) according to claim 1, further comprising a biodegradable filter (24), arranged inside said container (1) and in proximity to said first surface (2) and/or to said second surface (3), for filtering said beverage and prevent the escape of said preparation during the injection of said fluid solution under pressure in said biodegradable container (1).

17. The biodegradable container (1) according to claim 1, wherein said first surface (21) is comprised of multilayer material, and said end plate (6) is contained between two layers of said multilayer material.

18. The biodegradable container (1) according to claim 1, wherein at least one of said first surface (21) and said second surface (3) comprises at least one of an upper pre-engraved cardboard, a pre-drilled cardboard, and one or more layers of paper comprising at least one of a layer of paper of 40 g/sqm and a filter paper layer (3''').

19. The biodegradable container (1) according to claim 1, wherein said reinforcement means is in the chamber and comprises at least two radial elements extending vertically inside the body across a diameter of the tubular body according to a cross-configuration; wherein each of the at least two radial elements extends across a diameter extending through a centerpoint of the biodegradable container adjacent to at least one of the first opening and the second opening.

* * * * *